US011108570B2

(12) United States Patent
Huang et al.

(10) Patent No.: US 11,108,570 B2
(45) Date of Patent: Aug. 31, 2021

(54) METHOD AND APPARATUS FOR MULTIMEDIA COMMUNICATION, AND STORAGE MEDIUM

(71) Applicant: Tencent Technology (Shenzhen) Company Limited, Shenzhen (CN)

(72) Inventors: Liuwen Huang, Shenzhen (CN); Di Xue, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/547,376

(22) Filed: Aug. 21, 2019

(65) Prior Publication Data
US 2019/0379735 A1 Dec. 12, 2019

Related U.S. Application Data

(63) Continuation of application No. PCT/CN2018/092017, filed on Jun. 20, 2018.

(30) Foreign Application Priority Data

Jul. 18, 2017 (CN) .......................... 201710587065.4

(51) Int. Cl.
*H04L 29/06* (2006.01)
*H04L 9/32* (2006.01)
(Continued)

(52) U.S. Cl.
CPC .......... *H04L 9/3268* (2013.01); *H04L 9/0819* (2013.01); *H04L 9/14* (2013.01);
(Continued)

(58) Field of Classification Search
CPC . H04L 9/0819; H04L 9/3263; H04L 63/0823; H04L 63/1069; H04L 67/1091;
(Continued)

(56) References Cited

U.S. PATENT DOCUMENTS 7,957,733 B2 * 6/2011 Wang .................... H04W 4/029
455/426.2
8,881,180 B1 * 11/2014 Srikanth ................. H04L 51/30
719/328
(Continued)

FOREIGN PATENT DOCUMENTS

CN          101291241 A     10/2008
CN          103404132 A     11/2013
(Continued)

OTHER PUBLICATIONS

Tencent Technology, ISRWO, PCT/CN2018/092017, dated Sep. 27, 2018, 6 pgs.

(Continued)

*Primary Examiner* — Sher A Khan
(74) *Attorney, Agent, or Firm* — Morgan, Lewis & Bockius LLP

(57) ABSTRACT

This application discloses a method and an apparatus for multimedia communication. A session page is loaded by using a browser kernel integrated in a local client, and a script on the session page is executed by using the browser kernel, to perform the following operations: exchanging a control parameter with a peer client by using a signaling server; establishing a data channel between the local client and the peer client; collecting multimedia data and transmitting the multimedia data to the peer client through the data channel, so that the peer client plays the multimedia data by using a media stream parameter of the local client; and receiving, through the data channel, the multimedia data collected by the peer client, and playing the multimedia data on the session page according to a media stream parameter of the peer client. In this way, cross-client multimedia communication is implemented.

19 Claims, 11 Drawing Sheets

(51) Int. Cl.
  *H04L 9/08* (2006.01)
  *H04L 29/08* (2006.01)
  *H04L 9/14* (2006.01)

(52) U.S. Cl.
  CPC ........ *H04L 9/3263* (2013.01); *H04L 63/0823* (2013.01); *H04L 65/1069* (2013.01); *H04L 65/80* (2013.01); *H04L 67/02* (2013.01); *H04L 67/1091* (2013.01); *H04L 67/34* (2013.01)

(58) Field of Classification Search
  CPC ..... H04L 65/1069; H04L 65/80; H04L 67/02; H04L 67/34; H04L 9/3268; H04L 9/0841; H04L 9/14
  See application file for complete search history.

(56) References Cited

U.S. PATENT DOCUMENTS

| | | | | |
|---|---|---|---|---|
| 9,021,134 | B1* | 4/2015 | Patel | H04L 65/1083 709/246 |
| 2004/0034622 | A1* | 2/2004 | Espinoza | G06F 16/40 |
| 2004/0053619 | A1* | 3/2004 | Kim | H04W 72/042 455/445 |
| 2004/0111473 | A1* | 6/2004 | Lysenko | H04L 29/06027 709/206 |
| 2005/0175030 | A1* | 8/2005 | Moon | G06F 21/54 370/465 |
| 2005/0235048 | A1* | 10/2005 | Costa-Requena | H04L 65/1026 709/219 |
| 2007/0050510 | A1* | 3/2007 | Jiang | H04W 4/12 709/227 |
| 2007/0115933 | A1* | 5/2007 | Muhamed | H04L 41/5064 370/352 |
| 2007/0180135 | A1* | 8/2007 | Kenrick | H04N 21/25816 709/231 |
| 2008/0010688 | A1* | 1/2008 | Cai | H04L 63/20 726/28 |
| 2008/0242325 | A1* | 10/2008 | Bandera | G06Q 10/06 455/466 |
| 2009/0182999 | A1* | 7/2009 | Krig | H04L 63/061 713/156 |
| 2012/0005287 | A1* | 1/2012 | Gadel | H04L 51/066 709/206 |
| 2013/0031192 | A1* | 1/2013 | Caspi | H04L 65/1083 709/206 |
| 2013/0212228 | A1* | 8/2013 | Butler | G06T 11/60 709/219 |
| 2014/0074933 | A1* | 3/2014 | Ning | G06Q 10/10 709/204 |
| 2014/0241215 | A1* | 8/2014 | Massover | H04L 65/403 370/260 |
| 2014/0344575 | A1* | 11/2014 | Saremi | H04L 63/061 713/168 |
| 2015/0156814 | A1* | 6/2015 | Yie | H04W 80/06 370/329 |
| 2015/0180857 | A1 | 6/2015 | Schulman et al. | |
| 2016/0127680 | A1* | 5/2016 | Xiao | H04N 7/141 348/14.12 |
| 2016/0294913 | A1* | 10/2016 | Jansson | H04L 67/2809 |
| 2016/0321470 | A1* | 11/2016 | Singh | G06F 21/6263 |
| 2017/0041435 | A1* | 2/2017 | Simpson | H04L 43/16 |
| 2017/0053260 | A1* | 2/2017 | Zhou | G06Q 20/00 |
| 2017/0078226 | A1* | 3/2017 | Daly | H04L 51/066 |
| 2018/0063065 | A1* | 3/2018 | Ma | H04L 51/12 |
| 2019/0379735 | A1* | 12/2019 | Huang | H04L 9/0841 |

FOREIGN PATENT DOCUMENTS

| | | | |
|---|---|---|---|
| CN | 103580986 | A | 2/2014 |
| CN | 103650458 | A | 3/2014 |
| CN | 103702062 | A | 4/2014 |
| CN | 103702238 | A | 4/2014 |
| CN | 104219257 | A | 12/2014 |
| CN | 104780335 | A | 7/2015 |
| CN | 105142011 | A | 12/2015 |
| CN | 105407176 | A | 3/2016 |
| CN | 105869027 | A | 8/2016 |
| CN | 106657179 | A * | 5/2017 |
| CN | 106657179 | A | 5/2017 |
| EP | 2124420 | A1 * | 11/2009 ........ H04L 65/4084 |
| EP | 2770667 | A1 | 8/2014 |

OTHER PUBLICATIONS

Tencent Technology, IPRP, PCT/CN2018/092017, dated Jan. 21, 2020, 5 pgs.

* cited by examiner

METHOD AND APPARATUS FOR MULTIMEDIA COMMUNICATION, AND STORAGE MEDIUM

CROSS-REFERENCE TO RELATED APPLICATIONS

This application is a continuation application of PCT/CN2018/092017, filed on Jun. 20, 2018, which claims priority to Chinese Patent Application No. 201710587065.4, filed with the State Intellectual Property Office of the People's Republic of China on Jul. 18, 2017, all of which are incorporated herein by reference in their entirety.

FIELD OF THE TECHNOLOGY

This application relates to communications technologies, and in particular, to multimedia communications technologies.

BACKGROUND OF THE DISCLOSURE

With rapid development of the Internet, particularly the mobile Internet, clients available on a terminal tend to be diversified, and cover many aspects such as work, study, consumption, and entertainment. A typical application of a client is multimedia communication through the Internet in a form of audio, video, or the like. Using a social client as an example, a user may perform instant communication with another user on a platform of the social client by using the social client. Using an online shopping client as another example, a user can perform pre-sales and after-sales consultation with a vendor by using the shopping client anytime anywhere.

Currently, multimedia communication between users is limited to clients of the same type. For example, users using the same social client may perform multimedia communication by using a platform of the social client, but users using different types of clients cannot perform cross-client (type) multimedia communication. For example, a social client cannot directly communicate with an online shopping client. This inevitably affects efficiency of user communication.

For example, during actual application, there is often a scenario in which a user switches between different clients to communicate with users of the different clients, including: the user receives, on a social client, an online shop link of a vendor sent by a friend, and if wanting to perform temporary voice communication with the vendor, the user needs to switch the social client to background and invoke an online shop client to contact the vendor, and then switch the social client to foreground to continue to perform a voice or video chat with the friend.

Currently, related arts provide a solution of interconnecting background servers of different types of clients to forward a text message. However, the multimedia communication has more complex circumstances. Due to diversity of client types, adaption needs to be performed on communication protocol and multimedia data between clients of different types. On one hand, this makes it difficult to provide a unified solution of cross-client multimedia communication. On the other hand, audio/video data adaptation and forwarding between different clients consume a large quantity of resources of a background server, and a delay or a data loss is hard to avoid.

SUMMARY

Embodiments of this application provide a method and an apparatus for multimedia communication, and a storage medium, to implement cross-client multimedia communication in an efficient manner with intensive resources.

Technical solutions in the embodiments of this application are implemented as follows:

According to a first aspect, an embodiment of this application provides a method for multimedia communication performed at a terminal having one or more processors and memory storing a plurality of programs to be executed by the one or more processors, and the method comprising:

loading a session page by using a browser kernel integrated in a local client, and executing a script on the session page by using the browser kernel, to perform the following operations:

exchanging a control parameter with a peer client by using a signaling server, the control parameter including a network parameter and a media stream parameter;

establishing a data channel between the local client and the peer client by using an address and a port of the local client and an address and a port of the peer client that are included in the network parameter;

collecting multimedia data and transmitting the multimedia data to the peer client through the data channel, so that the peer client plays the multimedia data by using a media stream parameter of the local client; and receiving, through the data channel, the multimedia data collected by the peer client, and playing the multimedia data on the session page according to a media stream parameter of the peer client.

According to a second aspect, an embodiment of this application provides an apparatus for multimedia communication, including: one or more processors, memory coupled to the one or more processors and a plurality of programs stored in the memory that, when executed by the one or more processors, cause the transcoding capability configuration device to perform the aforementioned method for multimedia communication.

According to a third aspect, an embodiment of this application provides a non-transitory computer readable storage medium storing a plurality of machine readable instructions in connection with an apparatus having one or more processors, wherein the plurality of machine readable instructions, when executed by the one or more processors, cause the apparatus to perform the aforementioned method for multimedia communication.

When this application is applied, the foregoing embodiments have the following beneficial effects:

First, the client executes the script on the session page by using the built-in browser kernel, and exchanges the network parameter and the media stream parameter to establish the data channel. On one hand, the network parameter ensures that the data channel can be established by overcoming restrictions of different types of clients. On the other hand, the media stream parameter enables the collection and play of the multimedia data not to exceed capability limits of both parties, ensuring multimedia communication quality.

Second, the client can easily implement, by using the built-in browser kernel, multimedia communication between different types of clients performed on the session page, and in addition, multimedia communication between clients of the same type performed on the session page is compatible.

Third, the data channel between the clients is established based on the addresses and the ports of the clients, without using a background server of the clients. On one hand, a resource of the background server is saved. On the other hand, a problem of a delay or a data loss caused by adaptation and forwarding by using the background server is avoided, and the multimedia communication quality is ensured.

DESCRIPTION OF EMBODIMENTS

Figure 1:
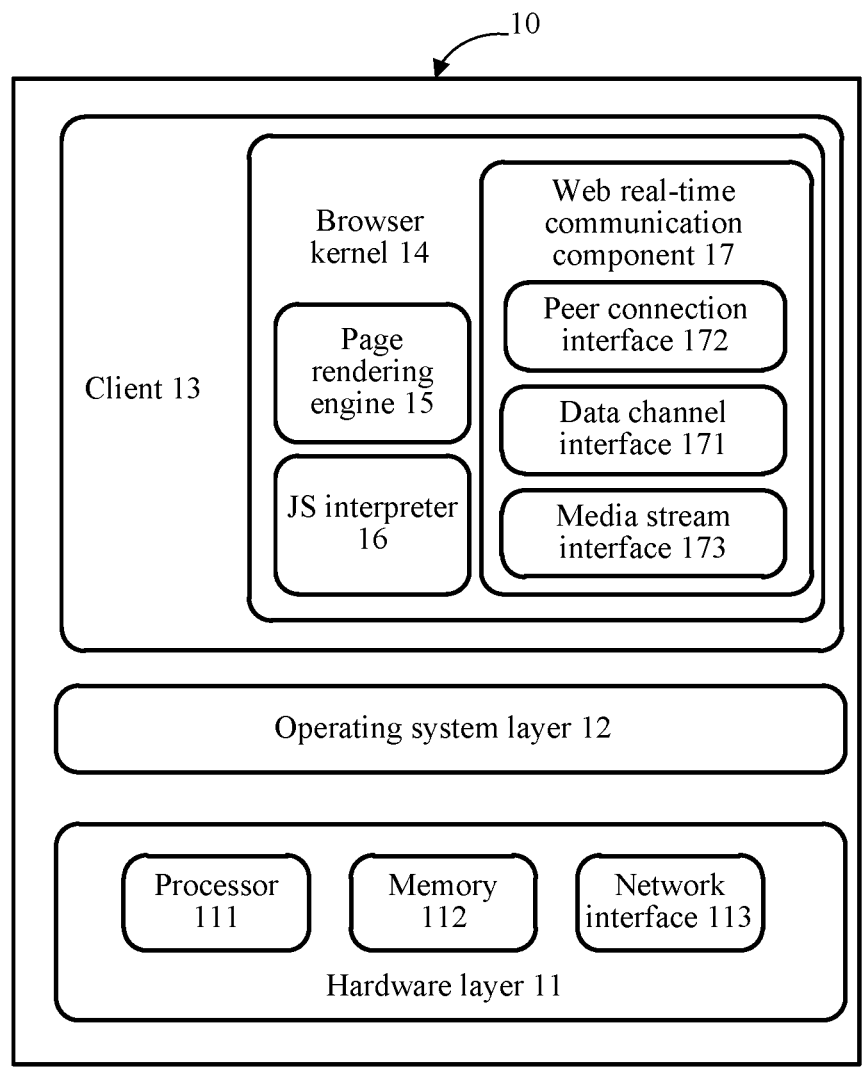
FIG. 1 is an optional schematic structural diagram of software and hardware of a terminal according to an embodiment of this application.

This application is further described in detail below with reference to the accompanying drawings and embodiments. It should be understood that the specific embodiments described herein are only used to describe this application, instead of limiting this application.

Before this application is further described in detail, nouns and terms provided in the embodiments of this application are described. The nouns and terms provided in the embodiments of this application are applicable to the following explanations.

(1) Client: The client configured to implement network communication on a terminal may be in a form of a mobile application (App) whose installation is supported on the terminal, for example, a browser or a social client. In this specification, a client is also referred to as a peer (Peer).

(2) Terminal: The terminal is an electronic device on which installation of a client is supported, for example, a smartphone, a tablet computer, or an in-vehicle terminal.

(3) Browser kernel: The browser kernel is configured to display a web page, and can implement an interaction on the web page by executing JavaScript (JS) on the web page. The browser kernel provided in this specification includes a Webkit (Webkit) kernel, and a third-party kernel, such as an X5 kernel integrated in a QQ browser, formed through modification performed based on the Webkit kernel.

(4) Web real-time communication (WebRTC) component: The WebRTC component includes an application interface (API) configured to perform real-time communication in the browser kernel. The API is invoked by a client in which the browser kernel is integrated, to implement, on a session page displayed on the client, a function of multimedia communication, such as audio/video communication, with another client. The multimedia communication means that a client establishes a link, used for transmitting multimedia data, to another client. In a possible implementation, the link used for transmitting multimedia data may be a peer to peer (P2P) direct link; when the direct link is used, data transmission does not require transit through a third-party server, the data transmission is performed only by a packet forwarding device on the link, and no additional application or plug-in need to be further installed on the terminal. In another possible implementation, the link used for transmitting multimedia data is a transit link, and when the transit link is used to transmit data, a transit server needs to correspondingly forward transmitted multimedia data to the client.

(5) Data channel: The data channel is a link that is used for transmitting data and that is established between clients. Control (such as start, stop, and end) of multimedia data transmission and control of quality of service may be further performed based on the link. When a link includes only a packet forwarding device but does not include another server (such as a background server or a transit server of the client), the link between clients is referred to as a direct link, and a data channel carried by the direct link is referred to as a direct data channel. When data can be transmitted from a client to another client over a link only after being transited by the transit server, the link between the clients is referred to as a transit link, and a data channel carried by the transit link is referred to as a transit data channel.

(6) Room: The room is a session formed by clients of the multimedia communication. The room is the session assigned with a unique address. A page of the session is represented by using, for example, a uniform resource locator (URL). Any client that accesses the room may receive audio/video data of another client that accesses the room.

(7) Multimedia data: The multimedia data is data obtained by comprehensively processing multimedia information such as a text, data, an image, an animation, and a sound, and the multimedia data generally may have a plurality of media forms such as sound, image, video, and text.

The following describes the terminal provided in the embodiments of this application. FIG. 1 is an example of a schematic structural diagram of software and hardware of a terminal according to an embodiment of this application, including a hardware layer 11, an operating system layer 12, a client 13, a browser kernel 14, and a WebRTC component 17. The following separately describes the structures.

The hardware layer 11 includes the following structure:

Memory 112: Memories 112 may be provided as various forms of non-volatile memories, for example, may be a read-only memory (ROM), a programmable read-only memory (PROM), and an erasable programmable read-only memory (EPROM). A non-volatile memory is configured to store various types of data to support an operation of the client 13. These data may include: any computer program configured to be operated on the client 13 and the operating system layer 12. According to the method for multimedia communication provided in the embodiments of this application, the data may be pre-stored in the memory 112 in a form of a JS file. Alternatively, when browser kernel 14 on the client 13 accesses a page of a room, the data may be downloaded to the memory 112, so that when running the client 13, the processor 111 may execute JS file by using the browser kernel 14 integrated in the client 13, to implement the method for multimedia communication set forth in the embodiments of this application.

Processor 111: The processor 111 may be an integrated circuit chip having a signal processing capability. In an implementation process, steps in the method for multimedia communication according to the embodiments of this application may be performed by using an integrated logic circuit in a hardware form in the processor 111 or an instruction in a software form. The processor 111 may be a general processor, a digital signal processor (DSP), another programmable logic device, discrete gate or transistor logic device, or discrete hardware assembly, or the like.

Network interface 113: The network interface 113 is configured to wired or wireless communication of the client 13, and the network interface 113 may be connected to a wireless network that is based on a communication standard, for example, Wi-Fi, 2G, 3G, 4G, and evolved 4G, or a combination thereof.

Operating system layer 12: The operating system layer 12 includes various system programs, such as a framework layer, a core library layer, and a driver layer, and is configured to: implement various basic services and process a task that is based on the hardware layer 11. In the embodiments of this application, use of any type of operating system is not excluded, and the operating system includes a Linux-kernel-based operating system such as the Android system, and may further include the iOS system and a Unix-like operating system.

Client 13: The client 13 is a client having a network communication requirement, for example, an application such as WeChat/QQ. In the embodiments of this application, running of any type of client is not excluded on the terminal 10.

The client 13 is configured to implement specific service logic of the client. Using an example in which the client is WeChat, service logic is used for implementing user functions, such as communication and sharing, on a WeChat social platform through interaction with a WeChat background server.

The browser kernel 14 is integrated in the client 13, to implement a browser function and a direct multimedia communication function on the client 13. It should be noted that, although the browser kernel 14 is integrated in the client 13, the client 13 and the browser kernel 14 may be run as two mutually independent instances. Therefore, communication between the client 13 and the browser kernel 14 should not be considered as a conflict with the structure shown in FIG. 1. The foregoing functions are separately described with reference to a structure of the browser kernel 14:

(1) Browser Function

Two basic modules are integrated in the browser kernel 14: Page rendering engine 15: A Web core (Web Core) engine may be used, to display a web page on the client 13, including loading data of the web page and rendering the web page, and typical application includes processes such as requesting the web page, loading the data, and rendering the web page. JS interpreter 16: The JS interpreter 16 is configured to interpret and execute JS in the web page rendered by the page rendering engine 15. For example, a JS Core engine may be used, to implement an interaction function of the web page and an enhanced function of the web page by interpreting and executing the JS. For example, data validity is first checked before a form is submitted, or animation effects on some pages are implemented based on an operation on a client.

(2) Direct Multimedia Communication Function

The WebRTC component 17 is further integrated in the browser kernel 14, to provide the client 13 with an API for real-time communication. When the API is a JS interface, the WebRTC component 17 may be provided as a software implementation of a JS file whose suffix name is ".js", the JS file is delivered to the client 13 as required, and the JS interpreter 16 in the browser kernel 14 interprets and execute the JS file, so that the client 13 invokes the API to establish a data channel to another client. This data channel may be used to transmit any data, and does not require transit through a third-party server (such as a background server of the client 13). The WebRTC component 17 further provides the client 13 with an interface for invoking a peripheral device, such as a camera/a microphone, of the terminal 10, and implements a multimedia communication function by transmitting audio/video data on the channel.

For example, the WebRTC component 17 includes three APIs, respectively:

(2.1) Peer connection (Peer Connection) interface 172: This interface is invoked by the client 13, and is encapsulated with a series of signaling, so that a client performing multimedia communication performs a method of exchanging/negotiating the following control parameters:

(2.1.1) network parameter, including:

(2.1.1.1) an Internet protocol (IP) address and port (namely, a port that is used for network communication and that is assigned to the client 13 by a host terminal of the client) of the client 13, for example, a local area network IP address and port when the client 13 is located on a local area network, or a wide area network IP address and port when the client 13 is located on a wide area network;

(2.1.1.2) bandwidth for the client 13, namely, bandwidth that can be provided to the client 13 when the client 13 accesses a network; and (2.1.1.3) IP address or port of a local area network or a firewall inside which the client 13 is located, where the IP address of the local area network or the firewall inside which the client 13 is located is a wide area network IP address of a network address translator (NAT) device or a firewall on the local area network; the port of the local area network or the firewall inside which the client 13 is located is a port that is enabled when the network address translator (NAT) device or the firewall on the local area network transmits a data packet to the local area network or the firewall;

(2.1.2) media stream parameter, including: a codec, a sampling rate, and a bit rate of audio supported by media of the client 13; and a codec, a frame rate, a resolution, and a bit rate of a video supported by the client 13; and (2.1.3) session control parameter, used for synchronizing a data channel status between clients 13, and creating, keeping, monitoring, and closing a data channel to a peer client (where, correspondingly the client 13 may be referred to as a local client).

It should be noted that, the data channel between the client 13 and the peer client may be carried over a link that is based on the user datagram protocol (UDP), to ensure data transmission efficiency, and session security may be ensured by using the datagram transport layer security (DTLS) protocol. Certainly, carrying a data channel between clients over a link that is based on the transmission control protocol (TCP) is not excluded in this specification. When the data channel is carried over link that is based on the TCP, encrypted transmission on the data channel is correspondingly implemented by using the secure sockets layer (SSL)/transport layer security (TLS).

The foregoing parameters are only an example, and the client 13 may invoke the peer connection interface 172 to exchange any session-related parameter with the peer client. The embodiments of this application do not exclude exchange of any session-related parameter, for example, a related security parameter used for implementing encrypted communication, such as a key algorithm or a quality of service (QoS) parameter, or a security parameter, such as a digital certificate or an encryption algorithm, used for negotiating an encryption key when encryption is required.

(2.2) Media stream (Media Stream) interface 173: This interface is invoked by the client 13, and is encapsulated with a series of methods for performing the following operation: obtaining an audio/video stream correspondingly collected and synchronized by the terminal 10 by using the peripheral device, such as the microphone/camera.

(2.3) Data channel (Data Channel) interface 171: This interface is invoked by the client 13, and is encapsulated with a series of methods for performing the following operation: transmitting an audio/video stream on a data channel between peer clients.

Figure 2:
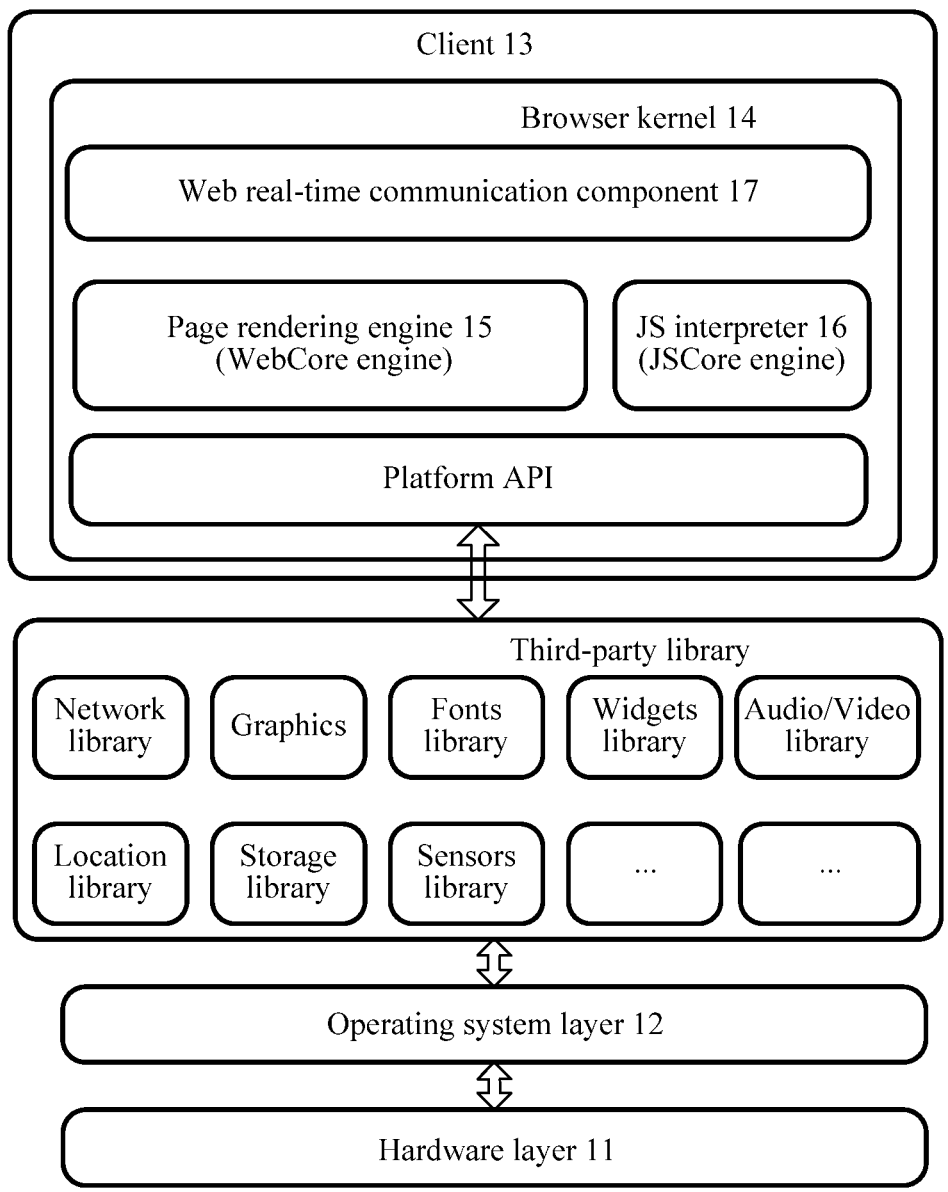
FIG. 2 is an optional schematic structural diagram of a browser kernel 14 integrated in a client 13 according to an embodiment of this application.

The following describes, with reference to FIG. 2, a structure of the browser kernel 14 integrated in the client 13. FIG. 2 is an example of a schematic structural diagram of the browser kernel 14 integrated in the client 13 according to an embodiment of this application. The browser kernel 14 can be run in different operating systems.

Above the operating system layer 12 is a third-party library on which running of the browser kernel 14 depends. The third-party library usually includes a graphics (Graphics) library, a network (Network) library, a storage (Storage) library, a fonts (Fonts) library, a sensors (Sensors) library, an audio/video (A/V) library, a location library, a widgets (Widgets) library, and the like, and is configured to perform basic operations of loading and rendering a web page. These third-party libraries provide, to the browser kernel 14 by using a platform API (different from the foregoing APIs), data that may be invoked.

In FIG. 2, a WebCore engine is used as the page rendering engine 15 of the browser kernel 14, and a JS Core engine is used as the JS interpreter 16. The WebCore engine includes basic components for displaying the web page, for example, a hypertext markup language (HTML) interpreter, a cascading style sheets (CSS) interpreter, and a scalable vector graphics (SVG) interpreter. An example of a process in which the WebCore engine renders a web page includes: A user initiates a name for accessing the web page, connects to the Internet to obtain data of the HTML web page, parses the web page data to generate an HTML document object model (DOM), generates a render (Render) tree, typesets the web page by using a CSS, and renders the web page.

The JS Core engine is a default JS interpreter in the browser kernel 14, but a case in which the JS Core engine is replaced with another type of interpreter is not excluded.

Above the browser kernel 14 is mainly a WebRTC interface 17 that is to be invoked by the client 13.

Figure 3:
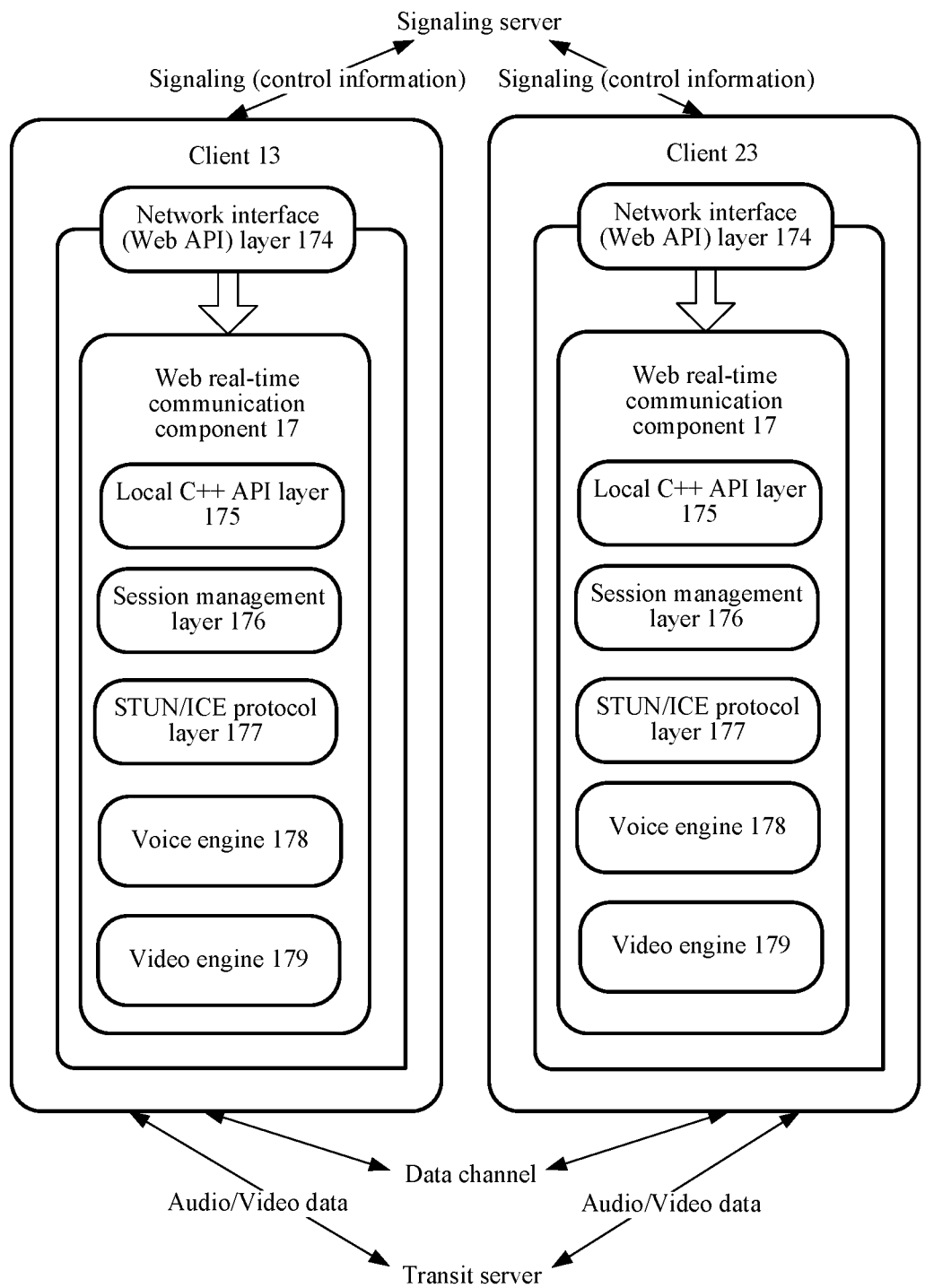
FIG. 3 is an optional schematic architectural diagram for audio/video communication according to an embodiment of this application.

For the convenience of description, for the WebRTC component 17, the foregoing shows only a client-oriented structure to be invoked by the client. The following describes, with reference to a specific structure of the WebRTC component 17, an architecture for performing audio/video communication by using the WebRTC component 17. FIG. 3 is an example of a schematic architectural diagram for audio/video communication according to an embodiment of this application. In FIG. 3, some structures of the client 13 shown in FIG. 2 are hidden. An example in which the client 13 is a local client, and the client 23 is a peer client is used. It may be understood that, the local client and the peer client are relative concepts. The two are clients run on different terminals. An architecture used by the client 13 and the client 23 to perform audio/video communication relates to a signaling mechanism and a data channel. The WebRTC component 17 is integrated in each client. The following separately describes the signaling mechanism and the data channel.

The signaling mechanism coordinates a process in which the client 13 and the client 23 perform information exchange by using a signaling server, to establish a data channel. A connection between the client 13 (or the client 23) and the signaling server (Signaling Server) is also referred to as a signaling channel. The signaling mechanism relates to the following several aspects:

(1) Exchanging Media Stream Parameters of Two Communication Parties by Using Signaling According to the session description protocol (Session Description Protocol), the client 13 encapsulates a media stream parameter of the client 13 into offer (Offer) SDP signaling, and sends the offer SDP signaling to the client 23 by using the signaling server. The client 23 establishes answer (Answer) SDP signaling that includes a media stream parameter of the client 23, and transmits the answer SDP signaling to the answer (Answer) SDP signaling by using the signaling server. In this way, both the client 13 and the client 23 learn of the media stream parameter of each other.

In addition, for a case of exchanging session control parameters, and a case in which encryption is required in a process of establishing a data channel to a client, all security parameters, such as the digital certificate and the encryption algorithm, used for negotiating an encryption key may be exchanged by using an offer/answer signaling mechanism. Similarly, the QoS parameter used for audio/video communication may also be exchanged by using the offer/answer signaling mechanism.

(2) Exchanging a Network Parameter by Using Signaling

According to the ICE protocol, the client 13 encapsulates the network parameter into ICE candidate (Candidate) signaling, and transmits the ICE candidate signaling to the client 23 through transit by using the signaling server. The client 23 receives the ICE candidate signaling sent by the signaling server, extracts the ICE candidate signaling to obtain the network parameter of the client 13. Similarly, the client 23 encapsulates the network parameter into the ICE candidate signaling, and transmits the ICE candidate signaling to the client 13 through transit by using the signaling server. The client 13 receives the ICE candidate signaling sent by the signaling server, and parses the ICE candidate signaling to obtain the network parameter of the client 23. In this way, both the client 13 and the client 23 obtain the network parameter of each other.

A possible case is that, because a client is located inside a firewall, the client cannot directly establish a direct data channel. In this case, data interaction needs to be performed between clients by using a transit server, the WebRTC component 17 uses the ICE protocol to integrate various NAT traversal technologies, for example, the simple traversal of UDP through NAT (STUN) protocol and the traversal using relay NAT (TURN) protocol. For example, the client 13 first attempts to obtain a wide area network IP address by using the STUN, to establish, to the client 23, a direct data channel that uses the UDP, and detects, by sending detection data, whether the data channel is available. If the detection fails, the client 13 attempts to establish a direct data channel that uses the TCP, and performs hypertext transfer according to the hypertext transfer protocol (HTTP) (where the HTTP is tried first, and then the HTTPS is tried), to perform detection. If the detection still fails, the client 13 establishes, to the client 23 by using a relay TURN server, a transit data channel for data transit.

It should be noted that, a websocket (Websocket) connection may be used as a signaling channel between the client 13 and the signaling server. The Websocket supports the client 13 (or the client 23) in forming a full duplex signaling channel to the signaling server after performing a handshake operation. Certainly, another mechanism may be alternatively used for a signaling channel between the client 13 (or the client 23) and the signaling server. For example, the client 13 (or the client 23) periodically establishes a connection to the signaling server, polls signaling, and then releases the connection.

The following describes the WebRTC component 17 of the client 13, and the description is similarly applicable to the WebRTC component 17 of the client 23:

(1) Network interface (Web API) layer 174: This layer provides APIs oriented to the client 13, including the peer connection interface 172, the media stream interface 173, and the data channel interface 171 shown in FIG. 1.

(2) Local C++ API layer 175: This layer is an entry that is provided for the client 13 to implement a Web API. This layer shields a difference of an underlying operating system, and abstracts a digital signal processing process as a local C++ API, thereby having a cross-platform feature.

(3) Session management layer 176: This layer provides functions of establishing and managing a direct data channel between the client 13 and the peer client. When the client 13 can establish a direct data channel to the client 23, the client 13 and the client 23 may transmit audio/video data on the direct data channel. When the client 13 cannot establish a direct data channel to the client 23, if the direct data channel cannot be established because a client is inside a firewall or a local area network, a STUN/ICE protocol layer 177 is responsible for exchanging the audio/video data by using the transit server.

(4) STUN/ICE protocol layer 177: The STUN protocol is used for crossing an NAT/a firewall through tunneling, to establish a data channel between clients of the NAT/the firewall. An ICE framework is used for obtaining, from a STUN server (located on the wide area network), an IP address and a port used for NAT/firewall traversal, so that multimedia data whose destination address is a wide area network IP address and port of a client can be distributed by the NAT device to a peer client.

(5) Voice engine (Voice Engine) 178: This engine is a framework including a series of audio multimedia processing, and relates to the following components:

(5.1) Internet speech audio codec (iSAC): This codec is a wideband/an ultra-wideband audio codec for a voice over Internet protocol (VoIP) audio stream, and is a default codec of the voice engine 178.

(5.2) Internet low bitrate codec (iLBC): This code is a narrowband voice codec for a VoIP audio stream.

(5.3) Net equalizer for voice (Net EQualizer for Voice): This equalizer is a voice signal processing element implemented by using software, uses an adaptive jitter control algorithm and a voice packet loss concealment algorithm, and can quickly adapt to a constantly changing network environment while maintaining a high resolution, thereby ensuring sound quality and reducing a buffer delay.

(5.4) Acoustic echo canceler (AEC): This signal processing element implemented by using software can cancel, in real time, an echo collected by a microphone.

(5.5) Noise reduction (NR): This signal processing element implemented by using software is configured to cancel some types of background noises related to the VoIP.

(6) Video engine (Video Engine) 179: This engine includes a series of video processing frameworks, provides functions of capturing a video by using a camera, transmitting video data by using a network, and displaying video data on an interface, and relates to the following components:

(6.1) Video image codec (recorded as a VP8 codec): This codec is a default codec of the video engine 179.

(6.1) Video jitter buffer: This buffer is configured to reduce negative influence brought by video jitter and a video packet loss.

(6.2) Image quality enhancement module: This module is configured to process an image captured by using a network camera, and has functions such as brightness detection, color enhancement, and noise reduction processing, to improve video quality.

Hereto, the terminal 10, the client 13 run on the terminal, the browser kernel 14, and the WebRTC component 17 have been described. By using an example in which a client first establishing a session is a local client and a client requesting to join the session is a peer client, the following describes a process in which clients perform multimedia communication. It may be understood that, the local client and the peer client are relative concepts. For example, a local client in one session may be a peer client in another session. In addition, the local client and the peer client may be clients of the same type, or certainly may be clients of different types. For example, the client 13 is a WeChat client, and the client 23 is a QQ client.

Figure 4:
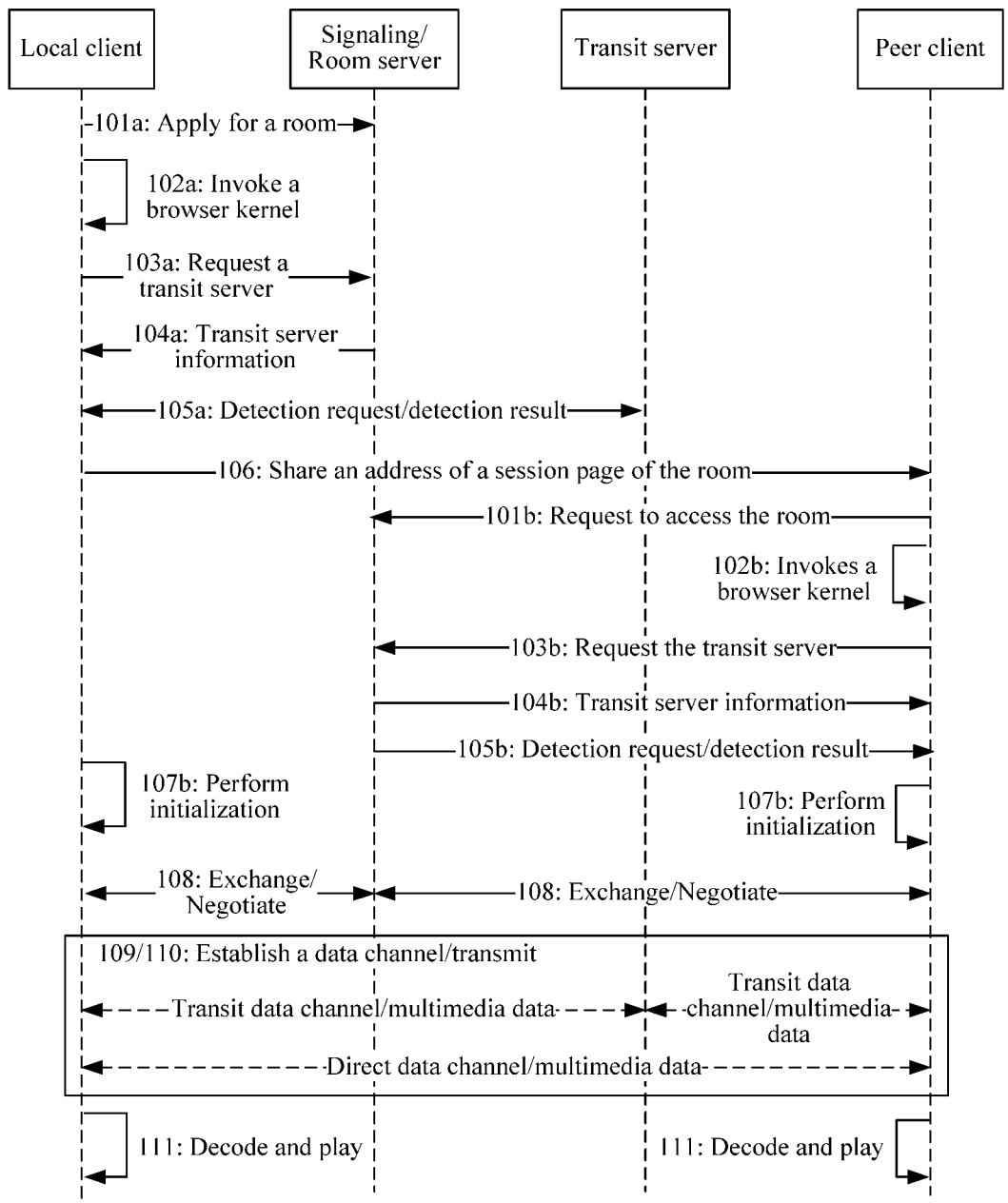
FIG. 4 is an optional schematic flowchart of a method for multimedia communication according to an embodiment of this application, and relates to a local client, a peer client, a signaling/room server, and a transit server.

FIG. 4 is an optional schematic flowchart of a method for multimedia communication according to an embodiment of this application, and relates to a local client, a peer client, a signaling/room server, and a transit server. The signaling/room server is the signaling server and the room server that are separately deployed, or certainly may be a server that integrates a room management function of the room server into the signaling server. The following describes steps shown in FIG. 4:

Step 101*a*: When needing to perform cross-client multimedia communication, the local client sends, to the room server, a request for accessing a room used for a session.

For example, an IP address of the room server is preconfigured on the local client. The local client requests, in advance, the room server to allocate a room. In response to the request of the local client, the room server returns an address of a session page of the room to the local client. In this way, when needing to perform multimedia communication, the local client may send an access request to the room server based on the address of the session page corresponding to the room.

For example, when needing to perform cross-client multimedia communication with another client, or needing to provide cross-client access support to another client, the local client needs to submit necessary authentication information to the room server, for example, a version of the local client, identifier information (such as a name and an account of a user that has logged in) of the user that has logged in. Description information (such as a client type and version) of a client allowing multimedia communication is configured on the room server. If authentication using the authentication information succeeds, a room, including an address of a session page corresponding to the room, may be allocated to the local client; and the local client is directed to the allocated address of the session page, so that the local client can access the session page.

A possible case of performing multimedia communication between clients is that, user identifiers of different types of clients are difficult to identify. For this case, the room server assigns a global uniform series number (ID) to each client that applies for a room or requests to join an existing room. The room server maintains a mapping relationship between the ID and a client type (for example, WeChat or QQ), and a logon user name (a WeChat account name or a QQ account name), and synchronizes the mapping relationship to the transit server and the signaling server that are set forth in the following, so that servers configured to implement the multimedia communication can distinguish between the IDs, ensuring efficiency of subsequent signaling/data processing.

The following continues to describe, according to step 102a, a subsequent processing process in which the local client shares with a session page of the room with the peer client.

Step 102a: The local client invokes a browser kernel integrated in the local client, displays the corresponding session page according to data of the session page of the room returned by the room server, and executes a script on the session page by using the browser kernel.

The browser kernel integrated in the local client not only executes the script on the session page, to implement a basic interaction function on the session page, but also executes a JS file of a WebRTC component 17, exchanges a control parameter with the peer client, establishes a data channel, and transmits multimedia data on the data channel. This is described in the following according to step 103a to step 105a, and step 106 to step 111.

Step 103a: The local client requests the signaling server to assign the transit server.

In an optional embodiment of this application, a possible case is that, the local client and the peer client do not have wide area network IP addresses due to various reasons (for example, at least one of the local client and the peer client is located inside the firewall, or is configured with an NAT, that is, located on a local area network), thereby being incapable of establishing a direct TCP link or UDP link (to carry a direct data channel). For this case, it is necessary to configure the transit server for the local client, to implement NAT/firewall traversal, and establish a transit data channel between the local client and the peer client by using the transit server when the NAT/firewall traversal cannot be implemented.

For example, a destination address and a destination port of data sent by the local client are correspondingly set to a wide area network IP address and port of an NAT device or a firewall of the peer client by using wide area network IP addresses and ports configured by the transit server for the local client and the peer client to detect the NAT device or the firewall. If the NAT device or the firewall can identify, by using a mapping relationship between the wide area network IP address and port of the NAT device or the firewall and a wide area network IP address and port of the peer client, that a destination of the data that comes from the local client is the peer client, the NAT/firewall traversal can be implemented, and the direct data channel between the local client and the peer client may attempt to be established by using the wide area network IP address and port detected by the transit server. If the attempt fails, the transit data channel is established by using the transit server.

Therefore, in step 101a, when sending the access request to the room server, the local client may further perform step 103a to request the signaling server to assign the transit server. It may be understood that, step 103a is an optional step.

In addition, a possible case of performing multimedia communication between clients is that, user identifiers of different types of clients are difficult to identify. For this case, the room server assigns a global uniform series number (ID) to each client that applies for a room or requests to join an existing room.

The signaling server maintains a mapping relationship between the ID and a client type (for example, WeChat or QQ), and a logon user name (a WeChat account name or a QQ account name), and synchronizes the mapping relationship to the transit server, so that servers configured to implement the multimedia communication can distinguish between different clients by using only the IDs, improving efficiency of subsequent signaling/data processing.

Step 104a: The local client obtains an IP address and authentication information of the transit server that are returned by the signaling server.

In an optional embodiment of this application, as described in step 103a, when the local client requests the signaling server to assign the transit server, the signaling server selects a transit server according to a screen rule (for example, a rule of a shortest link, or a rule of first ensuring link QoS), and sends an IP address of the selected transit server to the local client. In addition, to prevent an illegitimate client from abusing the transit server, and ensure a load balance of the transit server, the signaling server may further send, to the local client, authentication information for accessing the transit server, including a validity time (time) for logging in to the transit server, and a user name (recorded as a user) and a password (recorded as a password) for logging in to the transit server. An operation performed by the local client according to the authentication information is described in step 105a. It may be understood that, step 105a is an optional step.

Step 105a: The local client requests, according to the authentication information of the transit server, the transit server to detect a wide area network IP address and port of an NAT device/a firewall of the local client, and obtains a detection result.

Before being sent by the NAT device to the Internet, data packets to be sent to the Internet by all clients on a local area network are replaced with the wide area network IP address of the NAT device, source ports are replaced with ports (where ports used for transmitting data on the Internet to the clients are allowed) assigned to the clients. The NAT device records the ports assigned to the clients and local area network IP addresses and ports of the clients. For a data packet from the Internet, a destination address and port of the data packet are replaced, to be specific, replaced with searching for a local area network IP address and port of a corresponding client according to the destination port of the data packet, so that the data packet can be transmitted, on the local area network, to the corresponding client.

Processing for the firewall is similar. It can be learned from above that, for a data packet sent by the local client and a data packet sent by another client on the local area network on which the local client is located, source addresses carried by the data packets when the data packets are transmitted on the Internet are the same wide area network IP address (namely, the wide area network IP address of the NAT device), and source ports are different according to the clients. The NAT device records a mapping relationship between different clients and source ports sent for the clients, and the NAT device implements data packet distribution on the local area network according to destination ports of returned data packets and the mapping relationship. When the local client sends a request to the transit server, a wide area network IP address and port carried by the request are assigned by the NAT device to the local client. If the request is returned to the local client, the local client can learn of the wide area network IP address of port of the NAT device.

Hereto, operations performed before the local client exchanges a control parameter with, establishes a data channel to, and transmits multimedia data to the peer client have been described. For the peer client, when needing to join a room to perform multimedia communication with the local client, the peer client needs to perform processing similar to those in the foregoing steps. The following describes operations that need to be performed by the peer client before the peer client performs the control parameter exchange, data channel establishment, and the multimedia data transmission.

Before the local client exchanges the control parameter with, establishes the data channel to, and transmits the multimedia data to the peer client, the peer client needs to join a room of the local client, to obtain a JS file of a corresponding session page, and execute the JS file, to complete the control parameter exchange, data channel establishment, and the multimedia data transmission. The following describes, according to step 106 and step 101b to step 105b, an implementation process in which the peer client accesses a session page of the same room. It should be noted that, because the local client may initiate a sharing operation at any time once learning of an address of the session page of the room, a chronological sequence is not limited between execution of step 106 and step 101b to step 105b and execution of step 101a to step 105a.

Step 106: The local client shares an address of the session page of the room with the peer client.

For example, the local client may share the address of the session page of the room with the peer client in a form of a plaintext, a two-dimensional code, or the like. Using an example in which the local client is a QQ client, a user of the QQ client may send, on the QQ client, the address of the session page to a QQ client of another user; or a user of the QQ client invokes a sharing interface of a WeChat client of the user, to send the address of the session page to a WeChat client of another user. Sharing manners are in a great variety, and are not described one by one.

Step 101b: When needing to perform, in the room, cross-client multimedia communication with the local client, the peer client initiates, according to the address, shared by the local client, of the session page of the room, a request for accessing the room to the room server, to request to access the room.

For example, the peer client needs to submit necessary authentication information to the room server, for example, the version of the local client, the identifier information (such as the name and the account of the user that has logged in) of the user that has logged in. The description information (such as the client type and version) of the client allowing multimedia communication is configured on the room server. If the authentication using the authentication information succeeds, the room server may instruct users of the local client and the peer client to join the room. For example, the room server notifies, according to a mapping relationship between a name of a user that has logged in to the peer client and the global ID of the client, the local client of a name of a user that currently joins the room, delivers the data of the session page and a related JS file to the peer client, and directs the peer client to the address of the session page of the room, so that the peer client can access the session page.

Step 102b: The peer client invokes a browser kernel integrated in the peer client, displays the corresponding session page according to data of the session page of the room returned by the room server, and executes the script on the session page by using the browser kernel.

The browser kernel integrated in the peer client not only executes the script on the session page, to implement a basic interaction function on the session page, but also executes the JS file of the WebRTC component 17, exchanges a control parameter with the local client, establishes the data channel, and transmits multimedia data on the data channel. This is described in the following according to step 108 to step 111.

Step 103b: The peer client requests the signaling server to assign the transit server.

In an optional embodiment of this application, a possible case is that, as described above, it is necessary to configure the transit server for the local client and the peer client due to various reasons of the local client and the peer client (for example, at least one of the local client and the peer client is located inside the firewall, or is located on the local area network on which the NAT is configured). The direct data channel between the local client and the peer client attempt to be established by using the wide area network IP address and port configured by the transit server for the local client and/or the peer client to detect the NAT device or the firewall. If the attempt fails, the transit data channel is established by using the transit server. Therefore, in step 101b, when sending the access request to the room server, the local client may further perform step 103b to request the signaling server to assign the transit server. It may be understood that, step 103b is an optional step.

Step 104b: The peer client obtains the IP address and the authentication information of the transit server that are returned by the signaling server.

In an optional embodiment of this application, as described in step 103b, when the peer client further requests the signaling server to assign the transit server, the signaling server selects a transit server according to a screen rule (for example, a rule of a shortest link, or a rule of first ensuring link QoS), and sends an IP address of the selected transit server to the peer client. In addition, to prevent an illegitimate client from abusing the transit server, and ensure a load balance of the transit server, the signaling server may further send, to the peer client, authentication information for accessing the transit server, including a validity time (time) for logging in to the transit server, and a user name and a password for logging in to the transit server. An operation performed by the local client according to the authentication information is described in step 105b. It may be understood that, step 105b is an optional step.

Step 105b: The peer client requests, according to the authentication information of the transit server, the transit server to detect a wide area network IP address and port of an NAT device/a firewall of the peer client.

Specific implementation of step 105b is similar to that of step 105a, and details are not described herein again.

Hereto, operations performed before the peer client exchanges a control parameter with, establishes a data channel to, and transmits multimedia data to the local client have been described. The following describes, with reference to subsequent steps, processing of control parameter exchange/negotiation, data channel establishment, and data transmission performed by the local client and the peer client by executing the JS file.

Step 107a: The local client performs initialization.

Step 107b: The peer client performs initialization.

For example, initialization of the local client and the peer client relates to the following several aspects: (1) initialization of an audio/video stream; (2) initialization of a peer connection (Peer Connection) object: when an audio/video stream needs to be transmitted, related control of audio/video transmission is performed by using the Peer Connection object; and (3) initialization of an object used for creating SDP signaling and Candidate signaling: control information is subsequently filled in the object, to generate signaling carrying the corresponding control information.

Step 108: The local client exchanges/negotiates a control parameter with the peer client by using the signaling server.

The control parameter includes the foregoing network parameter and media stream parameter, and other types of control parameters, such as a QoS parameter and a security parameter. The control parameter is exchanged with the peer client according to a signaling mechanism by using the signaling server, or the control parameter may be negotiated. The following separately describes exchange/negotiation of the foregoing parameters.

(1) Exchange/Negotiation of the Media Stream Parameter

The local client collects a media stream parameter of the local client, adds the media stream parameter to Offer SDP signaling, and sends the Offer SDP signaling to the peer client through transit by using the signaling server. The peer client extracts the media stream parameter of the local client from the Offer SDP signaling, stores the media stream parameter, and sends the media stream parameter of the local client to the local client by adding the media stream parameter to Answer SDP signaling. Similarly, the local client extracts a network parameter of the peer client from the Answer SDP signaling, and stores the network parameter. Hereto, the exchange of the media stream parameter is completed.

For the negotiation of the media stream parameter, the local client adds an audio encoding/decoding candidate parameter supported by the local client and a video encoding/decoding candidate parameter supported by the local client to Offer SDP signaling, and sends the Offer SDP signaling to the peer client by using the signaling server. The peer client extracts the related parameters, selects, according to a capability of the peer client, an audio encoding/decoding parameter and a video encoding/decoding parameter to be used, adds the selected parameters to Answer SDP signaling, and sends the Answer SDP signaling to the local client by using the signaling server. The local client extracts the parameters from the Answer SDP signaling. Hereto, the negotiation of the media stream parameter is completed, and the two parties perform encoding/decoding processing by using the negotiated parameters.

For other types of control parameters, such as the QoS parameter and the security parameter, the foregoing manner of the exchange/negotiation of the media stream parameter may similarly serve as reference for the local client.

(2) Exchange/Negotiation of the Network Parameter

The local client adds, to Candidate signaling, a network parameter supported by the local client, for example, a wide area network IP address and port (if existing) of the local client, a local area network IP address and port (if existing) of the local client, or a wide area network IP address and port (if existing) of an NAT device/firewall, and sends the Candidate signaling to the peer client by using the signaling server. The peer client extracts the network parameter of the local client from the Candidate signaling, and stores the network parameter. Similarly, the peer client adds, to Candidate signaling, a network parameter configured for the peer client, and sends the network parameter to the local client by using the signaling server. The local client extracts the network parameter of the peer client from the Candidate signaling, and stores the network parameter. Hereto, the exchange of the network parameter is completed.

For the negotiation of the network parameter, the local client adds a network parameter, such as bandwidth, of the local client to Candidate signaling, and sends the Candidate signaling to the peer client by using the signaling server. The peer client extracts a related parameter, and determines a network address and a network status according to the related parameter, adds a network parameter of the peer client to Candidate signaling, and sends the Candidate signaling to the local client by using the signaling server. The local client extracts the parameter from the Candidate signaling. Hereto, the negotiation of the network parameter is completed.

Step 109: The local client establishes a data channel between the local client and the peer client according to an address and a port of the local client and an address and a port of the peer client included in the network parameter.

A data channel establishment manner is described for statuses of different networks on which the local client and the peer client are located.

(1) Both the local client and the peer client are located on a wide area network, in other words, have wide area network IP addresses and ports used for performing multimedia communication.

Figure 5A:
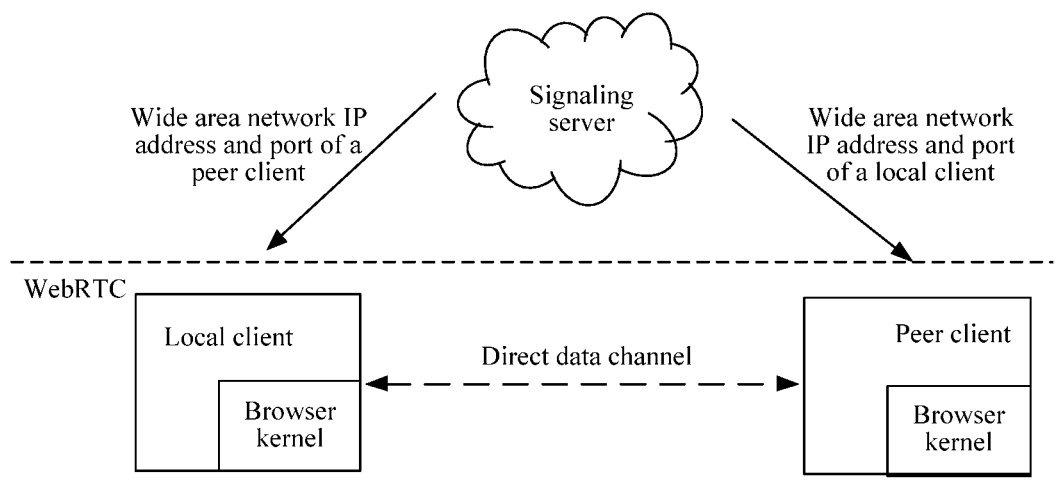
FIG. 5a is an optional schematic architectural diagram for establishing a data channel to perform multimedia communication between a local client and a peer client according to an embodiment of this application.

FIG. 5a is an example of a schematic architectural diagram for establishing a data channel to perform multimedia communication between a local client and a peer client according to an embodiment of this application. Based on the exchange, set forth in the foregoing steps, of the network parameter between the local client and the peer client, the local client and the peer client have learned of the wide area network IP address and port of each other, and the local client and the peer client establish a TCP-based direct link by performing three TCP handshake operations, to carry a direct data channel between the local client and the peer client. The TCP-based link can ensure reliable transmission of data.

In an alternative solution, the direct data channel between the local client and the peer client is carried on a UDP-based direct link, and the local client sends detection data to the peer client. If the local client receives, within a timeout period, response data returned by the peer client due to receiving of the detection data, it indicates that the UDP direct link has been successfully established. The UDP direct link is used for carrying the direct data channel between the local client and the peer client. Because the UDP is not oriented to a connection and does not ensure reliable arrival of data, from the perspective of a user perception, network jitter and a network delay may only cause stalling of audio/video communication, but do not cause a communication interruption, thereby having good performance of failure tolerance.

(2) At least one of the local client and the peer client is located inside the firewall or located on a local area network (in other words, configured with the NAT device), and the direct data channel is established.

Figure 5B:
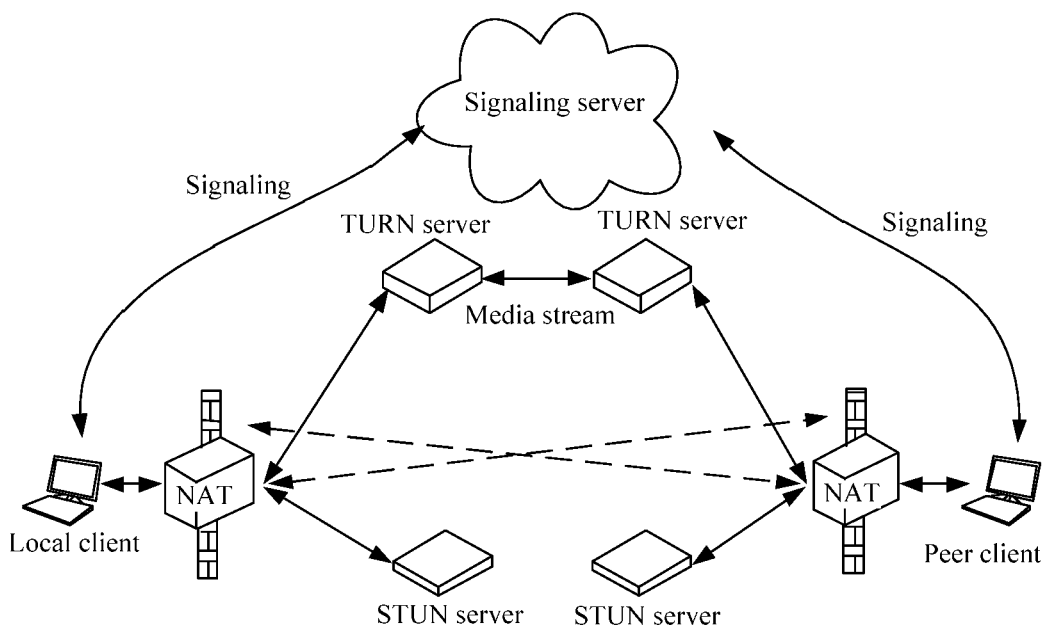
FIG. 5b is an optional schematic architectural diagram for establishing a data channel to perform multimedia communication between a local client and a peer client according to an embodiment of this application.

FIG. 5b is an example of a schematic architectural diagram for establishing a data channel to perform multimedia communication between a local client and a peer client according to an embodiment of this application. When a client is located inside a firewall, because the firewall has a filtering function, the client cannot establish a direct data channel even if the client has a wide area network IP address. When the client is located on a local area network, because the client does not have a wide area network IP address when being located on the local area network, the client similarly cannot establish a direct data channel.

FIG. 5b shows two types of transit servers: an STUN server and a TURN server. The STUN server is configured to detect a wide area network IP address and port of an NAT device/a firewall. For example, an STUN server that communicates with the local client is configured to: detect a wide area network IP address and port of the peer client, and notify the local client; an STUN server that communicates with the peer client is configured to detect a wide area network IP address and port of the local client, and notify the peer client; the TURN server is configured to provide a data transit function.

The local client and the peer client attempt to establish a direct data channel by using the wide area network IP addresses and ports detected by using the STUN server. A manner of establishing a direct data channel varies according to a protocol used for carrying the direct data channel. By using an example in which both the local client and the peer client are located in the firewall or are being configured with NAT devices, the following separately describes specific implementation processes of establishing a direct data channel by using different protocols:

(2.1) When the direct data channel is carried on a UDP-based link, the local client and the peer client send detection data to each other to detect whether the link is successfully established.

When the local client sends the detection data, a destination address and port correspond to the wide area network IP address and port of the NAT device/firewall of the peer client. The NAT device/firewall of the peer client sends the detection data to the peer client according to a local area network IP address and port of the peer client that are found in a port mapping table that is recorded.

After receiving the detection data, the peer client sends response data, and a destination address and port correspond to a wide area network IP address and port of an NAT device/firewall of the local client. The NAT device/firewall of the local client sends the detection data to the local client according to the local area network IP address and port of the local client that are found in the port mapping table that is recorded. After the local client receives response data returned by the peer client, it indicates that the direct link has been successfully established.

(2.2) When the direct data channel is carried on a TCP-based link, the local client and the peer client attempt to establish a TCP link by performing three handshakes. If the establishment succeeds, it indicates that the TCP link has successfully traversed the firewall/NAT device, and the direct data channel between the clients has been established.

A process of the handshakes between the local client and the peer client relates to the following steps:

First handshake: The local client sends a synchronize sequence number (SYN) (SYN=j) packet to the peer client, and enters an SYN_SENT state, waiting for the peer client to acknowledge.

A destination address and port of the SYN packet are respectively the wide area network IP address and port of the NAT device/firewall of the peer client. The NAT device/firewall of the peer client sends the data packet to the peer client according to the local area network IP address and port of the peer client that are found in the port mapping table that is recorded.

Second handshake: The peer client receives the SYN packet, sends an acknowledgement packet (ACK) (ACK=j+1) for acknowledging the SYN packet, and sends an SYN packet (SYN=k). In other words, the peer client sends an SYN+ACK packet to the local client, and in this case, the peer client enters an SYN_RECV state.

A destination address and port of the SYN+ACK packet are respectively the wide area network IP address and port of the NAT device/firewall of the local client. The NAT device/firewall of the local client sends the SYN+ACK packet to the local client according to the local area network IP address and port of the local client that are found in the port mapping table that is recorded.

Third handshake: The local client receives the SYN+ACK packet of the peer client, and sends an acknowledgement packet ACK (ACK=k+1) to the peer client. After the sending is completed, the two parties enter a connection success state, and the third handshake is completed. Hereto, the direct data channel that is between the local client and the peer client and that is carried on the TCP-based link has been established.

(3) The local client and the peer client fail to establish the direct data channel by using the wide area network IP address and port detected by the STUN server, and establish a transit data channel by using the TURN server.

The local client sends detection data to the TURN server. When the detection data passes through the NAT device/firewall, a source IP address and port of the detection data are replaced with the wide area network IP address and port of the NAT device/firewall (where the NAT device/firewall allows a port used for transmitting data to the local client), and the TURN server forwards the detection data to the peer client. Detection data returned by the peer client is similarly processed when passing through the NAT device/firewall. A source IP address and port are replaced with the wide area network IP address and port of the NAT device/firewall (where the NAT device/firewall allows a port used for transmitting data to the peer client). In this way, the TURN server binds the wide area network IP address and port of the NAT device/firewall of the local client, the wide area network IP address and port of the NAT device/firewall of the peer client, and an identifier of the transit data channel. An example of the binding is <the IP address and port of the peer client; the IP address and port of the local client; a data channel sequence number>. The transit server can perform data transit between the peer client and the local client according to a recorded binding relationship.

Step 110: The local client and the peer client collect multimedia data, and transmit the multimedia data through the data channel.

In an optional embodiment of this application, in a process of transmitting the multimedia data through the data channel, the local client and the peer client may still exchange control parameters, such as a network parameter, a media stream parameter, and a session control parameter, with each other by using the signaling server.

For example, by exchanging an updated network parameter, the local client and the peer client may continue to attempt to establish a direct data channel when a transit data channel is already established, and when the establishment succeeds, switch the multimedia data to the direct data channel for transmission, and vice versa. When it is ensured that the local client and the peer client can establish a data channel, the direct data channel is first used, reducing a delay of audio/video communication to the greatest extent.

For another example, by exchanging a session control parameter, an audio/video chat may be controlled at any time, for example, paused, resumed, and ended. For still another example, by exchanging a QoS parameter, adaptation may be performed according to quality of a link between the local client and the peer client, enabling an audio/video communication effect to be adaptive according to the quality of the link.

Step 111: The local client and the peer client receive the multimedia data through the data channel, decode the multimedia data according to the media stream parameter, and plays the multimedia data on the session page.

For example, the local client and the peer client exchange the media stream parameter by using the signaling server. Both parties obtain codec information of a media stream transmitted by each other. The receiver selects and uses, according to an encoder used by the sender, a corresponding decoder to decode and play the multimedia data from the sender. Certainly, in a process of the decoding and play, both parties may still exchange the media stream parameter, for example, negotiate a frame rate, a resolution, and the like, so that dynamic adjustment may still be performed in an audio/video communication process according to a user requirement.

In conclusion, according to the method for multimedia communication provided in the embodiments of this application, the client executes the script on the session page by using the built-in browser kernel, and exchanges the network parameter and the media stream parameter to establish the data channel. The exchange of the network parameter ensures that the data channel can be established by overcoming restrictions of different types of clients. The exchange of the media stream parameter enables the collection and play of the multimedia data not to exceed capability limits of both parties, ensuring multimedia communication quality. In addition, the client can easily implement, by using the built-in browser kernel, multimedia communication between different types of clients performed on the session page, and in addition, multimedia communication between clients of the same type performed on the session page is compatible. In addition, the data channel between the clients is established based on the addresses and the ports of the clients, without using a background server of the clients. On one hand, a resource of the background server is saved. On the other hand, a problem of a delay or a data loss caused by adaptation and forwarding by using the background server is avoided, and the multimedia communication quality is ensured.

In an optional embodiment of this application, to ensure that audio/video communication is not listened to by a third party, it is necessary to encrypt multimedia data transmitted on a data channel. In this embodiment of this application, to reduce resource consumption in an encryption/decryption process as far as possible, data may be encrypted and decrypted by using a symmetric encryption algorithm, and certainly, a case of using another encryption algorithm is not excluded. Before the local client collects the multimedia data and transmits the multimedia data to the peer client on the data channel, the local client performs an encrypted negotiation operation with the peer client on the data channel, to determine an encryption algorithm and a session key used for transmitting the multimedia data on the data channel, and correspondingly perform encryption/decryption processing on the data transmitted on the data channel. The foregoing encryption method is applicable to a case in which a TCP link or a UDP link is used as the data channel (including a direct data channel and a transit data channel).

For example, first, the local client sends a list of an encryption algorithm set supported by the local client to the peer client, so that the peer client performs selection according to the list of the encryption algorithm set. Each encryption algorithm set includes a series of information used for implementing encryption, for example, a certificate authentication algorithm (an algorithm used for checking whether a digital certificate is valid), a key exchange algorithm (used for generating a key for encrypting the data transmitted on the data channel), and an encryption algorithm and a message authentication algorithm (used for adding again a suffix to the key generated by using the key exchange algorithm, to form a complete key).

Second, the peer client sends an encryption algorithm set and a digital certificate that are selected to the local client. The digital certificate carries a public key of the peer client and a symmetric key of the peer client.

Third, the local client validates the digital certificate from the peer client according to a certificate validation algorithm (namely, the certificate authentication algorithm in the encryption algorithm set selected by the peer client) with reference to the public key of the peer client, and after the validation succeeds, sends a digital certificate of the local client, a public key of the local client, and a key of the local client to the peer client.

Finally, the peer client similarly validates the digital certificate from the local client according to the certificate validation algorithm (namely, the certificate authentication algorithm in the encryption algorithm set selected by the peer client) with reference to the public key of the local client, and after the validation succeeds, processes a symmetric key of the local client and the symmetric key of the peer client by using the message authentication algorithm, to generate a session key. The local client performs, according to the message authentication algorithm, processing that is the same as the processing performed by the peer client. In this way, the local client and the peer client obtain the same session key. In addition, in a process of exchanging the symmetric key, by exchanging the encryption algorithm set, the local client and the peer client determine the encryption algorithm used for encrypting the multimedia data.

In the embodiments of this application, an example in which two clients, namely, the local client and the peer client, perform multimedia communication is set forth in the foregoing. The multimedia communication set forth in the embodiments of this application is also applicable to a case in which a plurality of clients perform multimedia communication. Certainly, the plurality of clients may be of the same type or of different types, and architectures of the clients may still be understood according to FIG. 1 to FIG. 3.

Figure 6A:
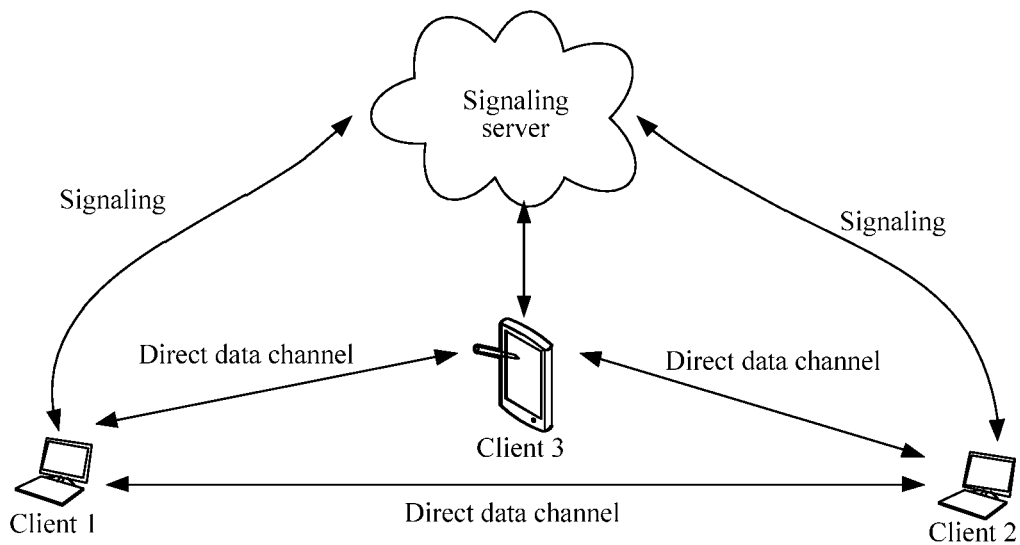
FIG. 6a is an optional schematic implementation diagram of multimedia communication between a plurality of clients according to an embodiment of this application.

In an example in which a plurality of clients perform multimedia communication, FIG. 6a is an example of a schematic implementation diagram of multimedia communication between a plurality of clients according to an embodiment of this application. Using a client 1, a client 2, and a client 3 as an example, any two clients exchange, according to the foregoing local client and peer client, a control parameter by using a signaling server, and establish a data channel. Whether a direct data channel or a transit data channel is established depends on statuses of networks on which the clients are located.

Figure 6B:
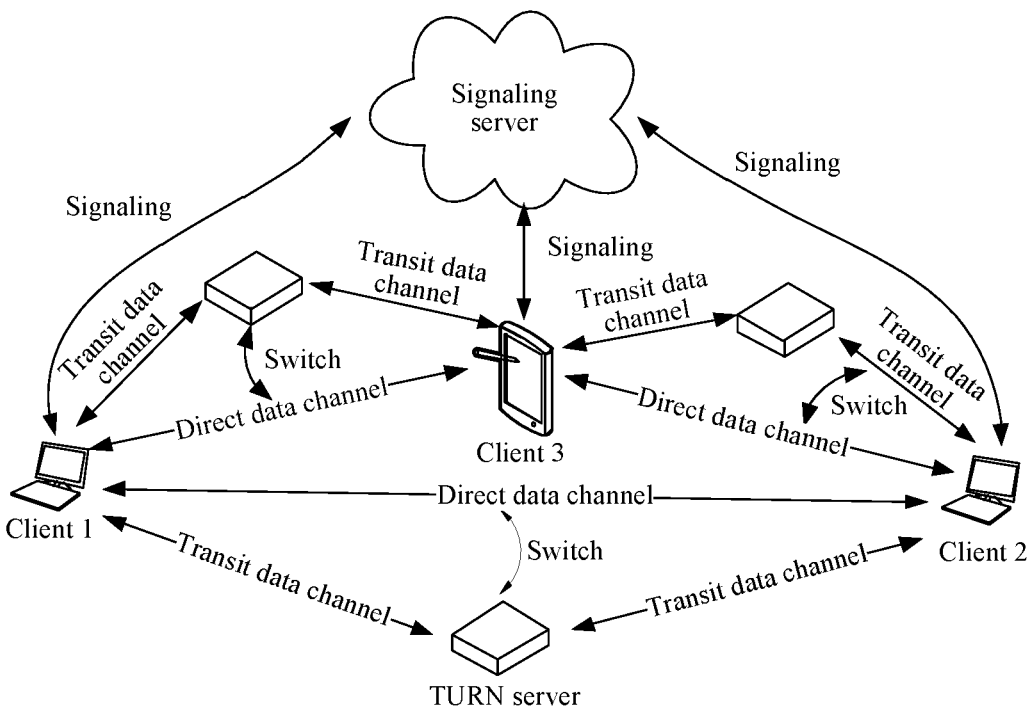
FIG. 6b is an optional schematic implementation diagram of multimedia communication between a plurality of clients according to an embodiment of this application.

In addition, when a quantity of clients that join a room is relatively many, according to the solution of establishing a data channel between every two clients shown in FIG. 6a, load of the clients is conspicuously increased, and even a case of instable load of the clients occurs. Using the client 1 as an example, the client 1 is a local client, and the client 2 and the client 3 are peer clients relative to the client 1. FIG. 6b is an example of a schematic implementation diagram of multimedia communication between a plurality of clients according to an embodiment of this application. When a quantity of peer clients exceeds a predetermined quantity (for example, the predetermined quantity may be set according to a load bearing capability of the local client, and herein, is set to 2, including 2), if there is a direct data channel between the client 1 and the client 2 or the client 3, a network parameter is exchanged by using a signaling server, a transit data channel is established by using the transit server, and multimedia data is transmitted on the transit data channel.

In this way, a link that carries the direct data channel between the local client and the peer client can be released, achieving a technical effect of saving a client resource. Certainly, it may be alternatively ensured that the direct data channel between the local client and the peer client exists at the same time. In this way, when the peer client exits a room that the peer client joins, making the quantity of peer clients decrease to a quantity less than the predetermined quantity, the local client may quickly switch multimedia data transmission between the local client and a remaining peer client in the room to the direct data channel, reducing a data transmission delay to the greatest extent.

It may be understood that, when the quantity of peer clients in the room is less than the preset quantity, and the local client switches (or establishes) a direct data channel between the local client and a peer client to transmit multimedia data, load on a link of a transit data channel that is already established between the local client and the peer client may be instantly released to save a resource. Certainly, a heartbeat mechanism may be used to maintain the load, for example, always maintain the load within a survival period of a session or maintain the load for a predetermined time, so that quick switching can be implemented when necessary.

Hereto, processes of implementing multimedia communication between two clients and between a plurality of clients has been described. It should be noted that, although the descriptions are provided in the foregoing embodiments by using an example in which the local client performs audio/video communication with the peer client, it may be understood that, the data channel between the local client and the peer client is also applicable to text data transmission. Therefore, the solutions set forth in the foregoing in the embodiments of this application are also applicable to text message transmission between different clients. For example, after a WeChat client user establishes a chat room, a QQ client user joins the room to chat with the WeChat client user in a text manner.

The following provides descriptions by using an example in which a WeChat client performs audio/video communication with a QQ mobile phone client. According to the following descriptions, persons skilled in the art may easily implement audio/video communication between other clients of different types, or certainly may implement audio/video communication between clients of the same type.

(1) Cross-Client Audio/Video Communication Architecture

Figure 7:
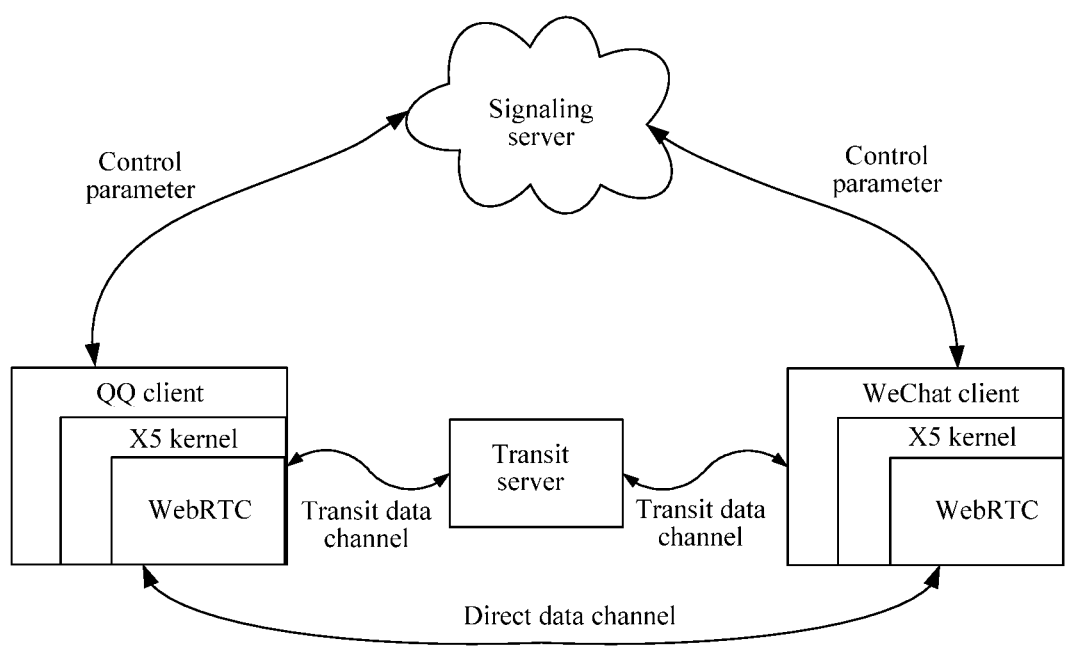
FIG. 7 is a schematic architectural diagram for audio/video communication between a QQ client and a WeChat client according to an embodiment of this application.

FIG. 7 is a schematic architectural diagram for audio/video communication between a QQ client (QQ for short below) and a WeChat client (WeChat for short below) according to an embodiment of this application, and mainly relates to:

(1.1) Signaling server: This server is mainly responsible for login authentication for a client, assigning a transit server to the client when the authentication succeeds, and authentication information for logging in to the transit server; supporting WeChat in negotiating the following information with QQ: a control parameter (for example, a media stream parameter, a network parameter, and a session control parameter), and a security parameter of a data channel; room management, including assigning a unique URL for each room, and notifying another client when a client joins and exits a room.

(1.2) Transit server: This server is mainly responsible for traversing, through STUN, an NAT device configured for a client, to attempt to establish a direct data channel, and establish a transit data channel between clients when the establishment fails; after the data channel is established, negotiating a DTLS protocol key, performing transit transmission of secure real-time transport protocol (SRTP) audio/video data, and performing real-time control protocol (RTCP) audio/video quantity control.

(1.3) X5 kernel: This kernel is a browser kernel, and support encapsulation of a WebRTC real-time communications component.

Figure 8:
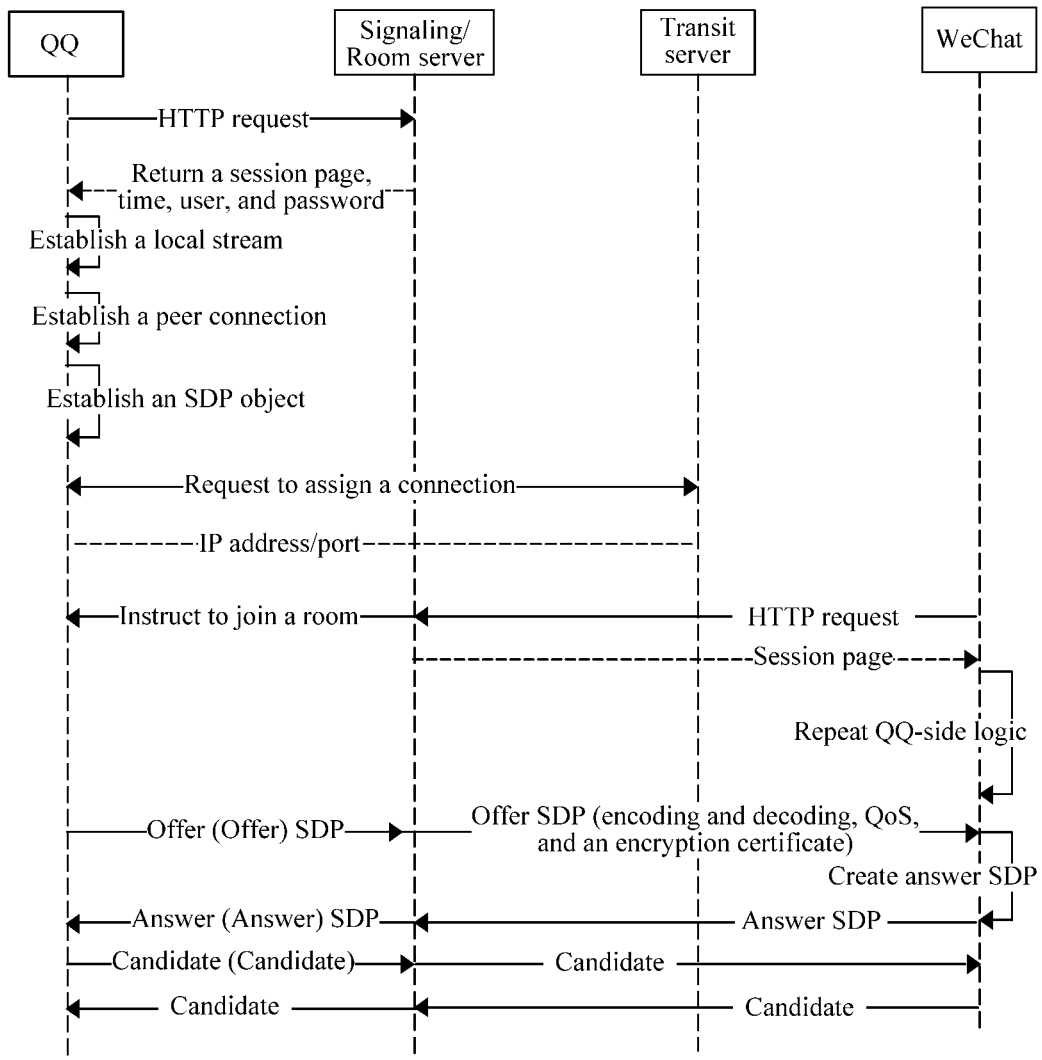
FIG. 8 is an optional schematic flowchart of cross-client audio/video communication between WeChat and QQ according to an embodiment of this application.

FIG. 8 is an example of a schematic flowchart of cross-client audio/video communication between WeChat and QQ according to an embodiment of this application, and relates to negotiation through a signaling channel, and establishment and use of a data channel, which are separately described.

QQ sends an HTTP request to the signaling server to establish the signaling channel, enters a room, exchanges various control parameters, and then establishes an encrypted direct or transit data channel to WeChat by using a transit server. Processes of establishing the signaling channel and the data channel are described in detail in the following.

Negotiation and Establishment of the Signaling Channel

A: A QQ mobile phone client sends an HTTP request for a URL of the accessed room (namely, a session, where each room corresponds to one session) to a room server.

The room server performs login authentication on the QQ mobile phone client, for example, checks whether the sent request is from a type of a client that allows audio/video communication, including the QQ mobile phone client or a WeChat client; and after the login authentication succeeds, delivers page data of a session page corresponding to the room, a JS file (JS implementation of the WebRTC component 17), an IP address and port assigned to the transit server, and authentication information to the QQ mobile phone client. The authentication information includes a validity time (time) for logging in to the transit server, and a user name (recorded as a user) and a password (recorded as a password) for logging in to the transit server.

B: The X5 kernel of the QQ mobile phone client parses the JS file, to implement the following operations:

(1) Establish a local stream, to be specific, obtain a local audio/video stream on a host terminal of the client.

(2) Create a peer connection (PeerConnection) object, invoke the media stream interface 173 to establish the local audio/video stream on the host terminal of the QQ mobile phone client, and add the local audio/video stream to the PeerConnection object.

The PeerConnection object is an encapsulated object in the media stream interface 173. Each audio/video session corresponds to one PeerConnection object. The X5 kernel of the QQ mobile phone client performs audio/video initiation, transmission, receiving, and end operations by using this PeerConnection object.

(3) Establish a local SDP object. The SDP object includes a control parameter, for example, a network parameter (such as an IP address and port of the QQ mobile phone client), or a media stream parameter (such as an audio/video codec supported by the QQ mobile phone client).

The QQ mobile phone client creates an SDP object, where the SDP object includes various control parameters such as a network parameter, a media stream parameter, and a security parameter, and stores the SDP object, to create SDP signaling.

C: The QQ mobile phone client requests the transit server to detect a wide area network IP address and port of an NAT device/firewall of the QQ mobile phone client, and the transit server authenticates the QQ mobile phone client according to authentication information, detects the wide area network IP address and port of the NAT device/firewall of the QQ mobile phone client, and returns the wide area network IP address and port to the QQ mobile phone client.

In step C, an example in which the QQ mobile phone client and WeChat are located on a local area network is used. Because there is no wide area network IP address and a direct data channel cannot be established, it needs to attempt to perform NAT/firewall traversal by using the wide area network IP address and port of the NAT device/firewall that are detected by the transit server, to establish a direct data channel between the QQ mobile phone client and WeChat. If the direct data channel cannot be established, a transit data channel is established by using the transit server.

D: WeChat joins the room in the same manner, and the room server notifies the QQ mobile phone client that a user joins in.

For example, by scanning a two-dimensional code on the session page or directly entering a URL of the room on WeChat, a WeChat user sends an HTTP request for accessing the room to the transit server, to perform steps A, B, and C performed by the QQ mobile phone client. WeChat obtains the wide area network IP address and port of the NAT device/firewall.

E: WeChat locally establishes an audio/video stream, a PeerConnection object, a data channel, and the like.

F: After receiving the notification indicating that the user joins in, the QQ mobile phone client sends request SDP signaling (carrying an Offer SDP object) by forwarding the request SDP signaling to WeChat by using the signaling server. WeChat selects a capability supported by both parties, encapsulates a selection result into the SDP object, adds the SDP object to answer SDP signaling, and returns the answer SDP signaling to the QQ mobile phone client by using the signaling server.

G: QQ encapsulates connection information (including IP addresses and ports and an address of the transit server) of available direct and transit data channels into Candidate signaling, and sends the Candidate signaling to WeChat by using the signaling server, and WeChat encapsulates the selection result into the SDP object to form Candidate signaling, and returns the Candidate signaling to the QQ mobile phone client by using the signaling server.

For example, WeChat may first use the direct data channel, and use the transit data channel when an attempt to use the direct data channel fails.

Figure 9:
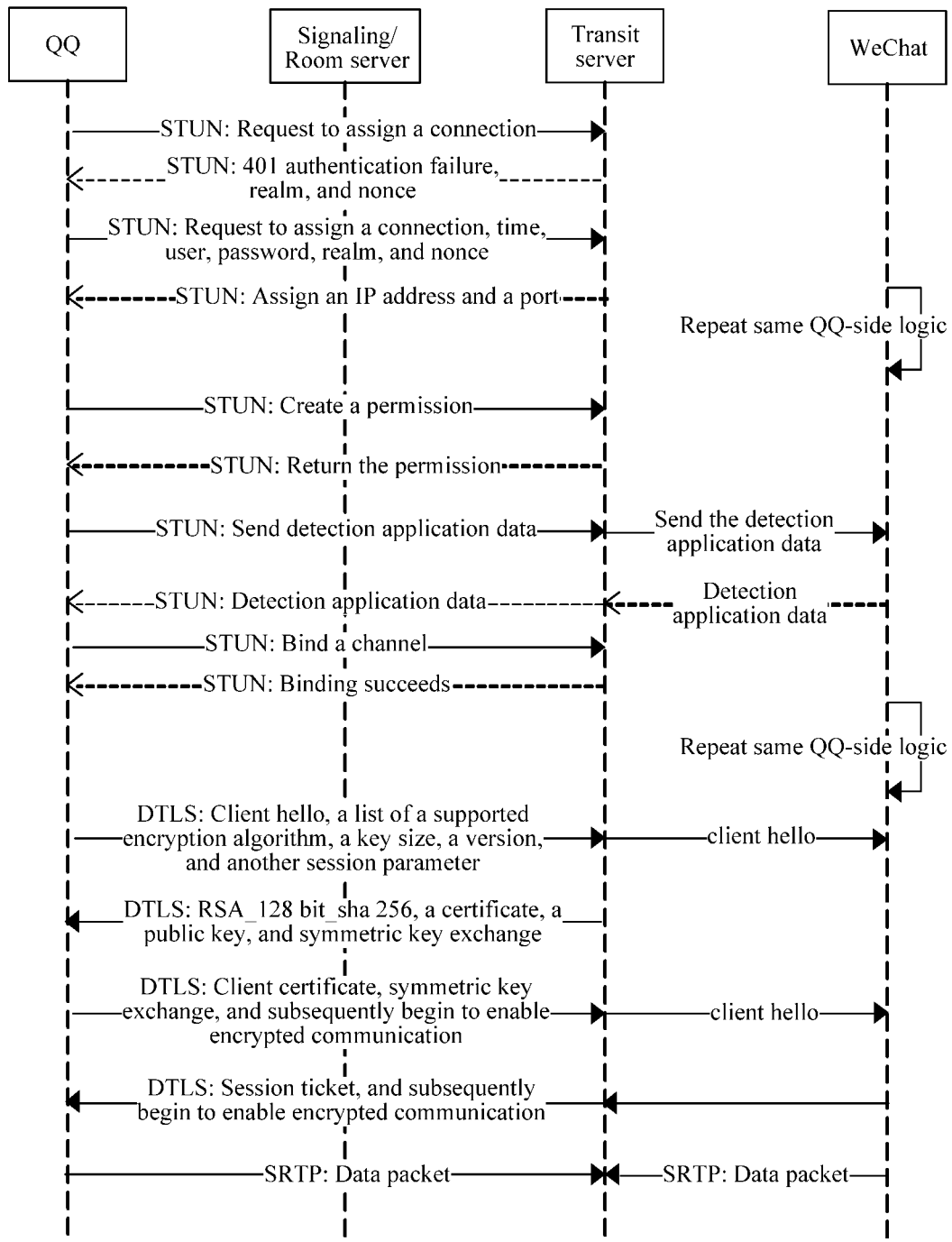
FIG. 9 is a schematic flowchart of establishing a transit data channel by using an example in which a mobile phone QQ establishes an audio/video chat with WeChat.

FIG. 9 is a schematic flowchart of establishing a transit data channel by using an example in which a mobile phone QQ establishes an audio/video chat with WeChat. A process of establishing a data channel for another cross-App audio/video chat is the same.

A: The QQ mobile phone client establishes a transit data channel by using the standard ICE protocol.

A request that is for accessing the room and that is first sent does not carry parameters such as a user name and a password. The transit server returns 401 authentication failure information. The 401 authentication failure information brings back the following fields: realm (realm), to be specific, the room to be accessed is a protected resource, and the user name, the password, and a random number (nonce) value need to be provided. Then, the QQ mobile phone client sends again a request carrying user, password, realm, and nonce values to request to assign a connection. In this case, connection information assigned by the transit server to the QQ mobile phone client and the transit server, namely, a destination IP address and port used by the QQ mobile phone client to send data to the transit server, is a wide area network IP address and port of the transit server (where the transit server allows a port used by the QQ mobile phone client to transmit data to the transit server).

B: A WeChat side performs the foregoing same logic.

C: QQ sends a (transit data channel) creation request to the transit server by using the foregoing IP address and port assigned for transmitting data. The transit server returns a permission, and then sends a detection data packet to WeChat by using the transit server. When WeChat replies with a detection data packet, QQ sends a channel binding message (for binding IP addresses and ports of WeChat and QQ) to the transit server, and the transit server binds the wide area network IP address and port assigned to the mobile phone QQ client, the wide area network IP address and port assigned to WeChat, and a channel sequence number, and returns a binding success.

D: WeChat repeatedly performs QQ-side logic.

E: Negotiations by using the DTLS protocol are performed through handshakes.

First step: QQ sends a DTLS client hello packet carrying information such as a DTLS version and a list of a supported encryption algorithm set, by forwarding the DTLS client hello packet to WeChat by using the transit server.

Second step: WeChat selects one encryption algorithm set in the list and sends the encryption algorithm set to the mobile phone QQ client. Each encryption algorithm set includes a certificate authentication algorithm, a key exchange algorithm, an encryption algorithm used for SRTP data transmission, a message authentication algorithm, and a digital certificate, a public key, and a symmetric key for exchange of WeChat.

Third step: After authenticating the digital certificate by using the certificate authentication algorithm, the mobile phone QQ client sends a digital certificate, a public key, and a symmetric key for exchange of the mobile phone QQ client to WeChat, and instructs to subsequently enable a channel encrypted by using the symmetric key.

Fourth step: After authenticating the certificate of the mobile phone QQ client, WeChat replies with a session ticket (Ticket), and instructs to enable the data channel encrypted by using the symmetric key.

The symmetric key used for the data encryption is formed in the following manner: WeChat generates a random number X, and the mobile phone QQ client generates a random number Y; WeChat encrypts X by using the key exchange algorithm to form a symmetric key for exchange, and sends the symmetric key for exchange to the mobile phone QQ client, and the mobile phone QQ client multiplies the symmetric key by Y, and then adds a suffix by using the message authentication algorithm, to form a complete key; and the mobile phone QQ client encrypts Y by using the key exchange algorithm to form a symmetric key for exchange, and sends the symmetric key to WeChat, and WeChat multiplies the symmetric key by X, and then adds a suffix by using the message authentication algorithm, to form a complete key, ensuring that WeChat and the mobile phone QQ client form the same symmetric key.

F: The two parties encrypt, by using the symmetric keys obtained through DTLS exchange, audio/video data transmitted by using the SRTP.

WeChat and the QQ mobile phone client decode the audio/video data by using a negotiated decoder, and play the audio/video data on the session page, thereby implementing cross-client audio/video communication.

It should be noted that, for the room server, to implement audio/video communication between clients of different types, in view of a case in which user identifiers of the different clients have a relatively large difference and are difficult to be identified, a global unique ID may be assigned to each client that sends a request, and a mapping relationship between an ID and a client user name (a WeChat account name, or a QQ account name) is maintained and synchronized to the transit server and the signaling server, so that the transit server and the signaling server configured to implement multimedia communication may use IDs to distinguish between different clients, ensuring different of subsequent signaling/data processing.

Figure 10:
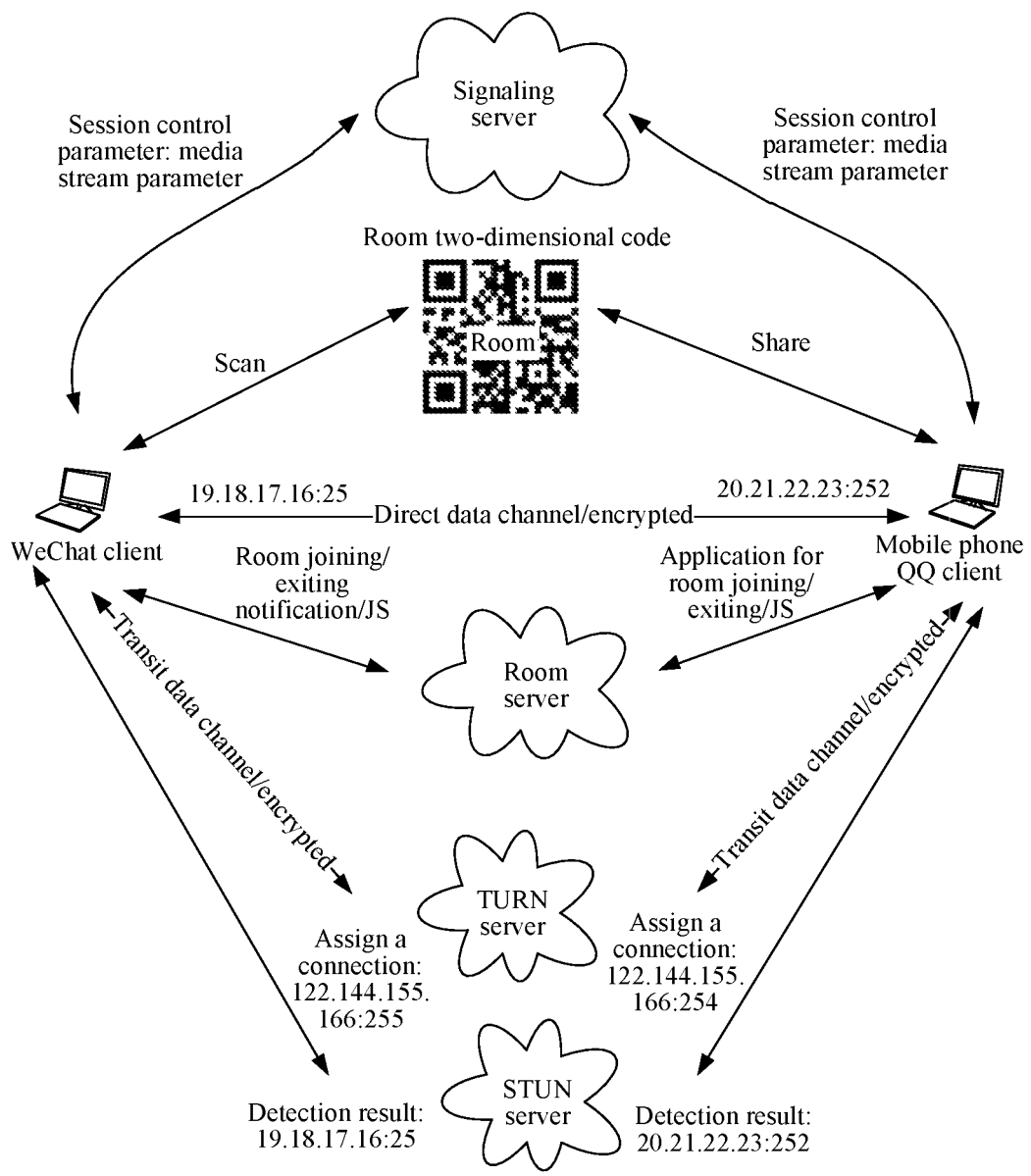
FIG. 10 is an optional schematic scenario diagram of communication between a WeChat client and a mobile phone QQ client according to an embodiment of this application.

Based on FIG. 8 and FIG. 9, FIG. 10 is an example of a schematic scenario diagram of communication between a WeChat client and a mobile phone QQ client according to an embodiment of this application. Several aspects, namely, room joining, parameter exchange, and data channel establishment are described.

1. Room Joining

A WeChat user wants to perform an audio/video chat with a mobile phone QQ client user. The WeChat user applies to a room server for an address of a session page of a room, and shares a corresponding two-dimensional code with the mobile phone QQ client user. Certainly, the mobile phone QQ client may access the room server to select a room that needs to be joined.

Once a mobile phone QQ client accesses the room of the WeChat user, the WeChat user receives a notification of the room server, including a name of a user that joins the room, and a used client (where the room server may quickly locate, according to a global ID submitted by the client that joins the room, a type of the client that joins the room, and a name of the client). Similarly, when the mobile phone QQ client exits the room, the WeChat user also receives a corresponding notification.

2. Parameter Exchange

Any user in the room may send a session control parameter by using a signaling server, to implement audio/video chat control, such as initiate, pause, and exit. In addition, the WeChat user and the mobile phone QQ client may set, on the session page of the room, an audio/video-related parameter, such as an audio sampling rate or a video resolution, and perform exchange/negotiation by using the signaling server, to select a related parameter used during the audio/video chat.

When audio/video communication quality needs to be controlled, WeChat further negotiates a QoS parameter with mobile phone QQ client by using the signaling server, for example, WeChat sends a candidate QoS parameter to the mobile phone QQ client by using the signaling server, to control audio/video encoding quality and data transmission quality (such as a transmission speed and a packet loss rate) to an expected level.

3. Direct Data Channel Establishment

The WeChat user and the mobile phone QQ user use the signaling server to negotiate and establish a data channel. For example, to reduce a delay, the WeChat user and the mobile phone QQ user agree on first establishing a direct data channel. When the direct data channel fails to be established, a transit data channel is established by using a TURN server. For the establishment of the direct data channel, a relatively common case is that, WeChat and the mobile phone QQ client are located inside the local area network/firewall, that is, do not have wide area network IP addresses. In this case, it needs to attempt to establish the direct data channel by using an STUN server.

WeChat and the mobile phone client request the STUN server to detect a wide area network IP address and port of an NAT device/a firewall. After the STUN server detects that a wide area network IP address and port of an NAT device/a firewall of WeChat is 19.18.17.16:253, and a wide area network IP address and port of an NAT device/a firewall of the mobile phone QQ client is: 122.144.155.166:254. WeChat and the mobile phone QQ client learn of the foregoing IP addresses and ports by exchanging a network parameter. WeChat sends a UDP detection data packet to 122.144.155.166:254. If a UDP response data packet is received from 19.18.17.16:253, it indicates that a direct data channel carried on a UDP link is successfully established between WeChat and the client.

A TCP link between WeChat and the mobile phone QQ client is established by attempting to perform three handshakes. The direct data channel carried on the UDP link is preferably established between WeChat and the mobile phone QQ client, avoiding a case in which reconnection is required due to a communication interruption caused by a problem such as a network delay or jitter.

4. Transit Data Channel Establishment

When failing to attempt to establish the direct data channel, WeChat and the mobile phone QQ client request the transit server to assign a connection, and the transit server correspondingly assigns 122.144.155.166:255 and 122.144.155.166:254 to WeChat and the mobile phone QQ client.

WeChat sends the UDP detection data packet to 122.144.155.166:254, and the detection data packet is forwarded by the transit server to the NAT device/firewall of the mobile phone QQ client. If the detection data packet traverses the NAT device/firewall of the mobile phone QQ client and arrives at the mobile phone QQ client, the mobile phone QQ client sends a response data packet to 122.144.155.166:255. If the response data packet traverses the NAT device/firewall of WeChat, WeChat requests the transit server to acknowledge, and the transit server binds 122.144.155.166:255 to 122.144.155.166:254, and subsequently forwards data for WeChat and the mobile phone client according to this binding relationship.

5. Encrypted Transmission

An example in which data transmitted on a data channel is encrypted by using a symmetric algorithm is used. WeChat and the mobile phone QQ client exchange a key material, and process the key material by using the same algorithm, to obtain the same session key. Because the key material can be exchanged at any time by using the signaling server, WeChat and the mobile phone client may periodically replace a session key, to avoid a possibility that the session key is intercepted and cracked.

In conclusion, the method embodiments of this application have the following beneficial effects:

First, the client executes the script on the session page by using the built-in browser kernel, and exchanges the network parameter and the media stream parameter to establish the data channel. On one hand, the network parameter ensures that the data channel can be established. On the other hand, the media stream parameter enables the collection and play of the multimedia data not to exceed capability limits of both parties, ensuring multimedia communication quality.

Second, the client can easily implement, by using the built-in browser kernel, multimedia communication between different types of clients performed on the session page, and in addition, multimedia communication between clients of the same type performed on the session page is compatible.

Third, clients first attempt to establish a direct data channel between each other, to reduce a transmission delay to the greatest extent. When the direct data channel cannot be established, the clients establish a transit data channel by using the transit server, ensuring that the clients can establish, in any network status, a data channel to transmit data, and having an extensive adaptability for different network environments.

Fourth, transmission on the data channel is encrypted by using the encryption algorithm, avoiding a case in which transmitted data is intercepted and cracked, and effectively ensuring communication security.

For the convenience of better implementing the foregoing solutions in the embodiments of this application, the following further provides a related apparatus configured to implement the foregoing solutions.

Figure 11:
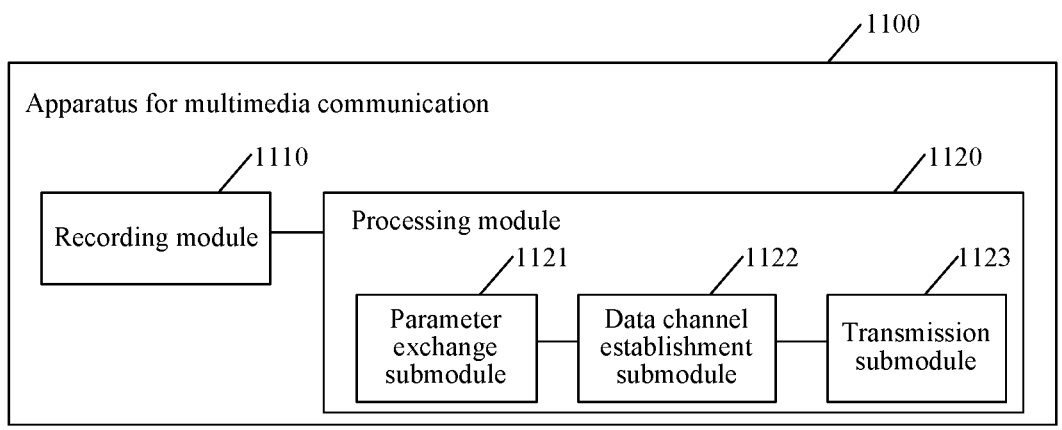
FIG. 11 is a schematic structural diagram of an apparatus for multimedia communication according to an embodiment of this application.

FIG. 11 is a schematic structural diagram of an apparatus 1100 for multimedia communication according to an embodiment of this application. The apparatus for multimedia communication 1100 includes:
 a recording module 1110, configured to load a session page a browser kernel integrated in a local client; and
 a processing module 1120, configured to execute a script on the session page by using the browser kernel, where the processing module 1120 includes:
 a parameter exchange submodule 1121, configured to exchange a control parameter with a peer client by using a signaling server, the control parameter including a network parameter and a media stream parameter;
 a data channel establishment submodule 1122, configured to establish a data channel between the local client and the peer client by using an address and a port of the local client and an address and a port of the peer client that are included in the network parameter; and
 a transmission submodule 1123, configured to: collect multimedia data and transmit the multimedia data to the peer client through the data channel, so that the peer client plays the multimedia data by using a media stream parameter of the local client; and receive, through the data channel, the multimedia data collected by the peer client, and play the multimedia data on the session page according to a media stream parameter of the peer client.

Optionally, the parameter exchange submodule 1121 is specifically configured to:
 obtain the control parameter configured by the local client;
 add the control parameter to a signaling message, and transmit the signaling message to the peer client by using the signaling server; and
 receive the signaling message transmitted by the peer client by using the signaling server, and obtain, through extraction from the received signaling message, the control parameter configured by the peer client.

Optionally, the data channel establishment submodule 1122 is specifically configured to:
 when both the local client and the peer client are on a wide area network, establish a direct data channel between the local client and the peer client by using a wide area network address and port of the local client and a wide area network address and port of the peer client that are included in the network parameter, where a predetermined protocol is used for a link carrying the direct data channel.

Optionally, the data channel establishment submodule 1122 is specifically configured to:
 when at least one of the local client and the peer client is located in a firewall or is configured with a network address translator device, correspondingly perform a traversal operation on the firewall or the network address translator device by using a wide area network address or port of the firewall or the network address translator device, to form a direct data channel between the local client and the peer client, where
 the direct data channel passes through the firewall or the network address translator device, and a predetermined protocol is used for a link carrying the direct data channel.

Optionally, the processing module 1120 further includes:
 a detection submodule, configured to detect the data channel; and
 a notification submodule, configured to instruct, when the detection succeeds, a transit server to record a binding relationship between an identifier of the data channel and the address and the port of the local client and the address and the port of the peer client; and
 then the transmission submodule 1123 is specifically configured to:
 transmit, to the transit server through the data channel, the multimedia data collected by the local client, so that the transit server forwards, to the peer client according to the binding relationship, the multimedia data collected by the local client.

Optionally, the network parameter includes a wide area network address and port of the local client, and the processing module 1120 further includes:
 an authentication information request submodule, configured to request, from the signaling server, authentication information used for logging in to the transit server;
 an authentication information receiving submodule, configured to receive authentication information returned when the signaling server successfully authenticates the local client; and an obtaining submodule, configured to: log in to the transit server by using the authentication information, and obtain the wide area network address or port of the firewall or the network address translator device that are detected by the transit server.

Optionally, the processing module 1120 further includes:

a transit data channel establishment submodule, when establishing the direct data channel by performing the traversal operation fails, establish, by using the transit server, a transit data channel that is between the local client and the peer client and that is used for data transit, where the transit data channel includes: a link between the local client and the transit server, and a link between the transit server and the peer client.

Optionally, the processing module further includes:

a key negotiation submodule, configured to perform an encrypted negotiation operation with the peer client through the data channel, to determine an encryption algorithm and a session key of the multimedia data transmitted on the data channel.

Optionally, the key negotiation submodule is specifically configured to:

receive an encryption algorithm set and a peer client digital certificate that are selected by the peer client and that are sent by the peer client through the data channel, where the encryption algorithm set includes at least a certificate authentication algorithm and an encryption algorithm;

verify the peer client digital certificate according to the certificate authentication algorithm;

determine a key exchange algorithm by performing a negotiation operation with the peer client, and exchange a key with the peer client; and encrypt, according to the key exchange algorithm, the key generated by the local client and the peer client, to form the session key used for encrypting the multimedia data.

Optionally, the processing module 1120 further includes:

a transit data channel establishment submodule, configured to: when a quantity of peer clients joining the session page exceeds a predetermined quantity, establish, to the peer client by using the transit server, a transit data channel used for data transit, and transmit the multimedia data to the peer client through the transit data channel.

Optionally, the processing module 1120 further includes:

a direct data channel release submodule, configured to: release the direct data channel between the local client and the peer client when the direct data channel is already established between the local client and the peer client; and establish, to the peer servers by using the transit server, the transit data channel used for data transit.

Optionally, the processing module 1120 further includes:

a direct data channel establishment submodule, configured to: when a quantity of peer clients joining the session page is less than a predetermined quantity, establish a direct data channel to the peer client, and transmit the multimedia data to the peer client through the direct data channel.

Optionally, the processing module 1120 further includes:

a transit data channel release submodule, configured to release a transit data channel between the local client and the peer client when the transit data channel used for data transit is already established between the local client and the peer client.

In conclusion, the apparatus embodiment of this application has the following beneficial effects:

First, the client executes the script on the session page by using the built-in browser kernel, and exchanges the network parameter and the media stream parameter to establish the data channel. On one hand, the network parameter ensures that the data channel can be established. On the other hand, the media stream parameter enables the collection and play of the multimedia data not to exceed capability limits of both parties, ensuring multimedia communication quality.

Second, the client can easily implement, by using the built-in browser kernel, multimedia communication between different types of clients performed on the session page, and in addition, multimedia communication between clients of the same type performed on the session page is compatible.

Third, clients first attempt to establish a direct data channel between each other, to reduce a transmission delay to the greatest extent. When the direct data channel cannot be established, the clients establish a transit data channel by using the transit server, ensuring that the clients can establish, in any network status, a data channel to transmit data, and having an extensive adaptability for different network environments.

Fourth, transmission on the data channel is encrypted by using the encryption algorithm, avoiding a case in which transmitted data is intercepted and cracked, and effectively ensuring communication security.

The descriptions are only specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A method for multimedia communication performed at a terminal having one or more processors and memory storing a plurality of programs to be executed by the one or more processors, and the method comprising:

loading a session page by using a browser kernel integrated in a local client running a first social networking program, wherein the session page corresponds to a communication session between a first user of the first social networking program at the local client and a second user of a second social networking program at a peer client, the second social networking program different from the first social networking program, and executing a script on the session page by using the browser kernel, to perform the following operations:

exchanging a control parameter with the peer client running the second social networking program, by using a signaling server, the control parameter comprising a network parameter and a media stream parameter;

establishing a data channel associated with the communication session between the local client and the peer client by using an address and a port of the local client and an address and a port of the peer client that are comprised in the network parameter;

collecting multimedia data associated with the communication session and transmitting the multimedia data to the peer client through the data channel, so that the peer client plays the multimedia data by using a media stream parameter of the local client;

receiving, through the data channel, the multimedia data collected by the peer client, and playing the multimedia data on the session page according to a media stream parameter of the peer client; and before collecting multimedia data and transmitting the multimedia data to the peer client through the data channel:

performing an encrypted negotiation operation with the peer client through the data channel, to determine an encryption algorithm and a session key of the multimedia data transmitted on the data channel, wherein the performing an encrypted negotiation operation with the peer client through the data channel, to determine an encryption algorithm and a session key of the multimedia data transmitted on the data channel comprises:

receiving an encryption algorithm set and a peer client digital certificate that are selected by the peer client and that are sent by the peer client through the data channel, wherein the encryption algorithm set comprises at least a certificate authentication algorithm and an encryption algorithm;

verifying the peer client digital certificate according to the certificate authentication algorithm;

determining a key exchange algorithm by performing a negotiation operation with the peer client, and exchanging a key with the peer client; and encrypting, according to the key exchange algorithm, the key generated by the local client and the peer client, to form the session key used for encrypting the multimedia data.

2. The method for multimedia communication according to claim 1, wherein the exchanging a control parameter with a peer client by using a signaling server comprises:

obtaining the control parameter configured by the local client;

adding the control parameter to a signaling message, and transmitting the signaling message to the peer client by using the signaling server; and receiving the signaling message transmitted by the peer client by using the signaling server, and obtaining, through extraction from the received signaling message, the control parameter configured by the peer client.

3. The method for multimedia communication according to claim 1, wherein the establishing a data channel between the local client and the peer client by using an address and a port of the local client and an address and a port of the peer client that are comprised in the network parameter comprises:

when both the local client and the peer client are on a wide area network, establishing a direct data channel between the local client and the peer client by using a wide area network address and port of the local client and a wide area network address and port of the peer client that are comprised in the network parameter, wherein a predetermined protocol is used for a link carrying the direct data channel.

4. The method for multimedia communication according to claim 1, wherein the establishing a data channel between the local client and the peer client by using an address and a port of the local client and an address and a port of the peer client that are comprised in the network parameter comprises:

when at least one of the local client and the peer client is located in a firewall or is configured with a network address translator device, correspondingly performing a traversal operation on the firewall or the network address translator device by using a wide area network address or port of the firewall or the network address translator device, to form a direct data channel between the local client and the peer client, wherein the direct data channel passes through the firewall or the network address translator device, and a predetermined protocol is used for a link carrying the direct data channel.

5. The method for multimedia communication according to claim 1, wherein the method further comprises:

before collecting multimedia data and transmitting the multimedia data to the peer client through the data channel:

detecting the data channel; and instructing, when the detection succeeds, a transit server to record a binding relationship between an identifier of the data channel and the address and the port of the local client and the address and the port of the peer client; and the transmitting the multimedia data to the peer client through the data channel comprises:

transmitting, to the transit server through the data channel, the multimedia data collected by the local client, so that the transit server forwards, to the peer client according to the binding relationship, the multimedia data collected by the local client.

6. The method for multimedia communication according to claim 1, wherein the method further comprises:

when a quantity of peer clients joining the session page exceeds a predetermined quantity, establishing a transit data channel to the peer client by using the transit server for data transit, and transmitting the multimedia data to the peer client through the transit data channel.

7. The method for multimedia communication according to claim 6, wherein the method further comprises:

releasing the direct data channel between the local client and the peer client when the direct data channel is already established between the local client and the peer client; and establishing the transit data channel to the peer servers by using the transit server for data transit.

8. The method for multimedia communication according to claim 1, wherein the method further comprises:

when a quantity of peer clients joining the session page is less than a predetermined quantity, establishing a direct data channel to the peer client, and transmitting the multimedia data to the peer client through the direct data channel.

9. The method for multimedia communication according to claim 8, wherein the method further comprises:

releasing a transit data channel between the local client and the peer client when the transit data channel used for data transit is already established between the local client and the peer client.

10. A method for multimedia communication performed at a terminal having one or more processors and memory storing a plurality of programs to be executed by the one or more processors, and the method comprising:

loading a session page by using a browser kernel integrated in a local client running a first social networking program, wherein the session page corresponds to a communication session between a first user of the first social networking program at the local client and a second user of a second social networking program at a peer client, the second social networking program different from the first social networking program, and executing a script on the session page by using the browser kernel, to perform the following operations:

exchanging a control parameter with the peer client running the second social networking program, by using a signaling server, the control parameter comprising a network parameter and a media stream parameter;

establishing a data channel associated with the communication session between the local client and the peer client by using an address and a port of the local client and an address and a port of the peer client that are comprised in the network parameter;

collecting multimedia data associated with the communication session and transmitting the multimedia data to the peer client through the data channel, so that the peer client plays the multimedia data by using a media stream parameter of the local client;

receiving, through the data channel, the multimedia data collected by the peer client, and playing the multimedia data on the session page according to a media stream parameter of the peer client, wherein the establishing a data channel between the local client and the peer client by using an address and a port of the local client and an address and a port of the peer client that are comprised in the network parameter comprises:

when at least one of the local client and the peer client is located in a firewall or is configured with a network address translator device, correspondingly performing a traversal operation on the firewall or the network address translator device by using a wide area network address or port of the firewall or the network address translator device, to form a direct data channel between the local client and the peer client, wherein the direct data channel passes through the firewall or the network address translator device, and a predetermined protocol is used for a link carrying the direct data channel, and the method further comprises:

comprising, by the network parameter, a wide area network address and port of the local client;

before the network information is exchanged with the peer client by using the signaling server, requesting, from the signaling server, authentication information used for logging in to a transit server;

receiving the authentication information returned by the signaling server after the signaling server successfully authenticates the local client; and logging in to the transit server by using the authentication information, and obtaining the wide area network address or port of the firewall or the network address translator device that are detected by the transit server.

11. The method for multimedia communication according to claim 4, wherein the method further comprises:

when establishing the direct data channel by performing the traversal operation fails, establishing, by using the transit server, a transit data channel that is between the local client and the peer client and that is used for data transit, wherein the transit data channel comprises: a link between the local client and the transit server, and a link between the transit server and the peer client.

12. The method for multimedia communication according to claim 10, wherein the method further comprises:

before collecting multimedia data and transmitting the multimedia data to the peer client through the data channel:

performing an encrypted negotiation operation with the peer client through the data channel, to determine an encryption algorithm and a session key of the multimedia data transmitted on the data channel.

13. The method for multimedia communication according to claim 12, wherein the performing an encrypted negotiation operation with the peer client through the data channel, to determine an encryption algorithm and a session key of the multimedia data transmitted on the data channel comprises:

receiving an encryption algorithm set and a peer client digital certificate that are selected by the peer client and that are sent by the peer client through the data channel, wherein the encryption algorithm set comprises at least a certificate authentication algorithm and an encryption algorithm;

verifying the peer client digital certificate according to the certificate authentication algorithm;

determining a key exchange algorithm by performing a negotiation operation with the peer client, and exchanging a key with the peer client; and encrypting, according to the key exchange algorithm, the key generated by the local client and the peer client, to form the session key used for encrypting the multimedia data.

14. An apparatus for multimedia communication, comprising: one or more processors, memory coupled to the one or more processors and a plurality of programs stored in the memory that, when executed by the one or more processors, cause the transcoding capability configuration device to perform operations including:

loading a session page by using a browser kernel integrated in a local client running a first social networking program, wherein the session page corresponds to a communication session between a first user of the first social networking program at the local client and a second user of a second social networking program at a peer client, the second social networking program different from the first social networking program, and executing a script on the session page by using the browser kernel, to perform the following operations:

exchanging a control parameter with the peer client running the second social networking program, by using a signaling server, the control parameter comprising a network parameter and a media stream parameter;

establishing a data channel associated with the communication session between the local client and the peer client by using an address and a port of the local client and an address and a port of the peer client that are comprised in the network parameter;

collecting multimedia data associated with the communication session and transmitting the multimedia data to the peer client through the data channel, so that the peer client plays the multimedia data by using a media stream parameter of the local client; and receiving, through the data channel, the multimedia data collected by the peer client, and playing the multimedia data on the session page according to a media stream parameter of the peer client; and before collecting multimedia data and transmitting the multimedia data to the peer client through the data channel:

performing an encrypted negotiation operation with the peer client through the data channel, to determine an encryption algorithm and a session key of the multimedia data transmitted on the data channel, wherein the performing an encrypted negotiation operation with the peer client through the data channel, to determine an encryption algorithm and a session key of the multimedia data transmitted on the data channel comprises:
  receiving an encryption algorithm set and a peer client digital certificate that are selected by the peer client and that are sent by the peer client through the data channel, wherein the encryption algorithm set comprises at least a certificate authentication algorithm and an encryption algorithm;
  verifying the peer client digital certificate according to the certificate authentication algorithm;
  determining a key exchange algorithm by performing a negotiation operation with the peer client, and exchanging a key with the peer client; and
  encrypting, according to the key exchange algorithm, the key generated by the local client and the peer client, to form the session key used for encrypting the multimedia data.

15. The apparatus for multimedia communication according to claim 14, wherein the exchanging a control parameter with a peer client by using a signaling server comprises:
  obtaining the control parameter configured by the local client;
  adding the control parameter to a signaling message, and transmitting the signaling message to the peer client by using the signaling server; and
  receiving the signaling message transmitted by the peer client by using the signaling server, and obtaining, through extraction from the received signaling message, the control parameter configured by the peer client.

16. The apparatus for multimedia communication according to claim 14, wherein the establishing a data channel between the local client and the peer client by using an address and a port of the local client and an address and a port of the peer client that are comprised in the network parameter comprises:
  when both the local client and the peer client are on a wide area network, establishing a direct data channel between the local client and the peer client by using a wide area network address and port of the local client and a wide area network address and port of the peer client that are comprised in the network parameter, wherein a predetermined protocol is used for a link carrying the direct data channel.

17. The apparatus for multimedia communication according to claim 14, wherein the establishing a data channel between the local client and the peer client by using an address and a port of the local client and an address and a port of the peer client that are comprised in the network parameter comprises:
  when at least one of the local client and the peer client is located in a firewall or is configured with a network address translator device, correspondingly performing a traversal operation on the firewall or the network address translator device by using a wide area network address or port of the firewall or the network address translator device, to form a direct data channel between the local client and the peer client, wherein
  the direct data channel passes through the firewall or the network address translator device, and a predetermined protocol is used for a link carrying the direct data channel.

18. The apparatus for multimedia communication according to claim 14, wherein the operations further comprise:
  when a quantity of peer clients joining the session page exceeds a predetermined quantity:
  establishing a transit data channel to the peer client by using the transit server for data transit; and
  transmitting the multimedia data to the peer client through the transit data channel.

19. The apparatus for multimedia communication according to claim 14, wherein the operations further comprise:
  releasing the direct data channel between the local client and the peer client when the direct data channel is already established between the local client and the peer client; and
  establishing the transit data channel to the peer servers by using the transit server for data transit.

* * * * *